(12) United States Patent
Chatani

(10) Patent No.: US 6,792,292 B1
(45) Date of Patent: Sep. 14, 2004

(54) PORTABLE INFORMATION COMMUNICATION TERMINAL, ENTERTAINMENT SYSTEM, AND STORAGE MEDIUM

(75) Inventor: Masayuki Chatani, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 0 days.

(21) Appl. No.: 09/538,875

(22) Filed: Mar. 30, 2000

(30) Foreign Application Priority Data

Mar. 31, 1999 (JP) .............................................. 11-93992

(51) Int. Cl.$^7$ ................................................ H04M 1/00
(52) U.S. Cl. ................ 455/566; 455/414.1; 455/556.1; 455/556.2; 455/557; 705/20; 705/26; 235/378; 235/385; 340/5.61; 340/5.65; 340/5.91; 340/5.92
(58) Field of Search .............................. 455/566, 414.1, 455/420, 556.1, 556.2, 557; 705/20, 26; 235/378, 385; 340/5.61, 5.65, 5.91, 5.92

(56) References Cited

U.S. PATENT DOCUMENTS

| | | | | |
|---|---|---|---|---|
| 5,504,475 A | * | 4/1996 | Houdou et al. | 340/5.91 |
| 5,930,767 A | * | 7/1999 | Reber et al. | 705/26 |
| 6,253,190 B1 | * | 6/2001 | Sutherland | 235/383 |
| 6,269,342 B1 | * | 7/2001 | Brick et al. | 235/383 |
| 6,315,195 B1 | * | 11/2001 | Ramachandran | 235/380 |
| 6,318,631 B1 | * | 11/2001 | Halperin | 235/383 |

FOREIGN PATENT DOCUMENTS

| | | |
|---|---|---|
| JP | 10187848 A | 7/1998 |
| JP | 11053453 A | 2/1999 |
| JP | 2000024324 A | 1/2000 |
| JP | 2000341657 | 12/2000 |
| WO | 96/33561 | 10/1996 |

* cited by examiner

Primary Examiner—William Trost
Assistant Examiner—Stephen D'Agosta
(74) Attorney, Agent, or Firm—Katten Muchin Zavis Rosenman

(57) ABSTRACT

A portable information communication terminal can easily be combined with an existing industrial system. Article discount information is broadcast from a central computer of the headquarters of a convenience store via a broadcasting system, and received by a portable information communication terminal. An image of the article and a discount price represented by the article discount information are displayed on a display screen of a display monitor. When the user purchases the displayed image, the user selects the desired article displayed on the display screen of a display monitor by a manual controller. A bar code corresponding to the selected article is displayed on a display screen of the portable information communication terminal. The user takes the portable information communication terminal with the bar code displayed on the display screen to the convenience store. In the convenience store, a bar-code reader reads a discount code displayed on the display screen, and the user can purchase the article at a discount price.

9 Claims, 23 Drawing Sheets

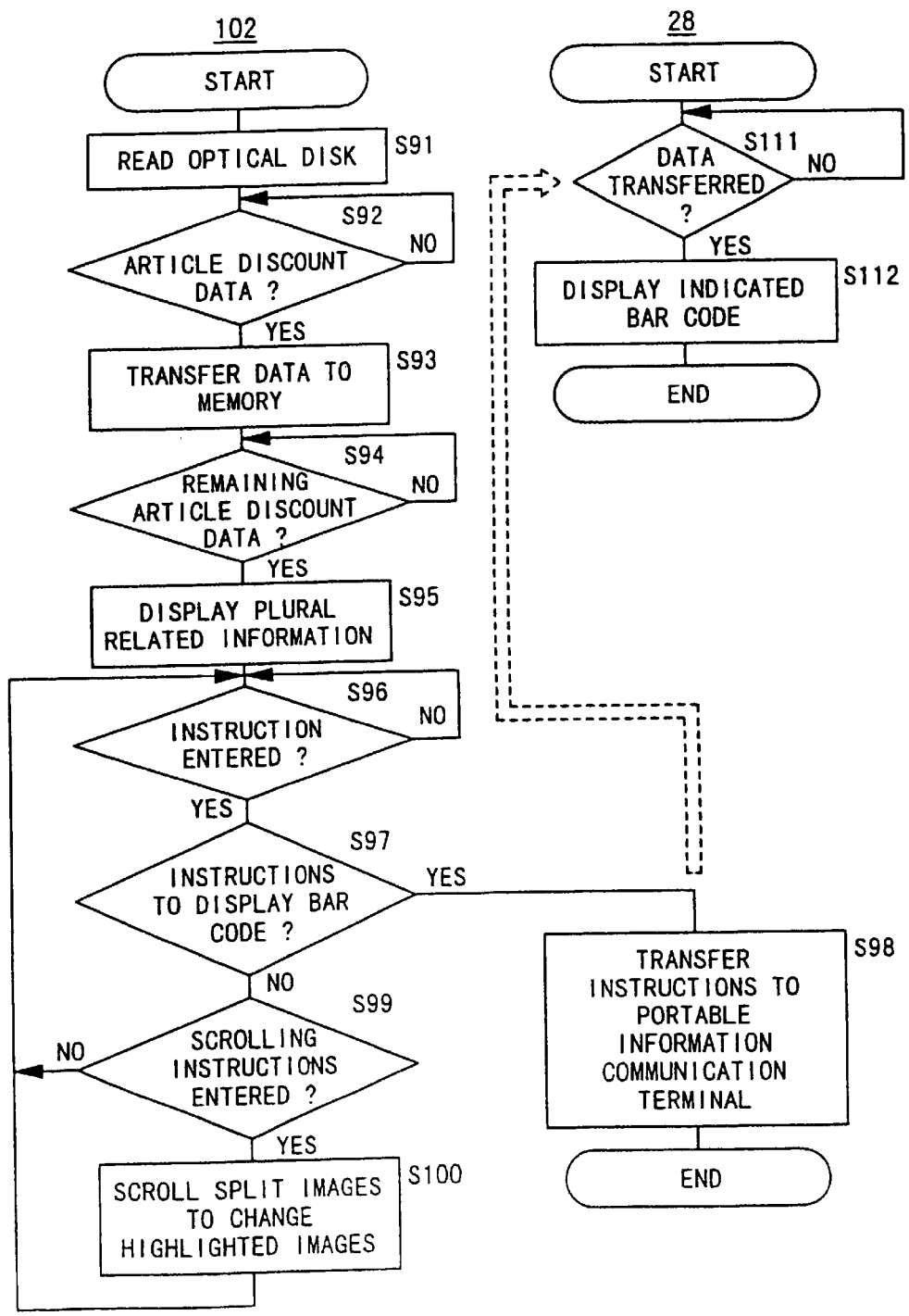

PORTABLE INFORMATION COMMUNICATION TERMINAL, ENTERTAINMENT SYSTEM, AND STORAGE MEDIUM

BACKGROUND OF THE INVENTION

1. Field of the Invention

The present invention relates to a portable information communication terminal preferably for use as a portable information communication terminal capable of receiving wireless signals using a wireless paging system or pager or a portable information communication terminal connectable to an entertainment apparatus, an entertainment system, and a storage medium for use in an entertainment apparatus.

2. Description of the Related Art

Portable information communication terminals (also referred to as PDA "Personal Digital Assistant") having a flat display unit such as a liquid crystal display (LCD) unit, e.g., personal computers, electronic notebooks, portable telephone sets, PHS terminals, pagers, etc. have been in widespread usage.

Entertainment apparatus for downloading programs from mass-storage storage mediums such as CD-ROMs to play games or playing back music pieces in CDs are also gaining growing popularity.

Conventional PDAs have not been considered for connection to industrial systems such as store automation systems for efficient retail store operation.

There has been a demand for automatically and simply entering individual items of information, such as individual PDA identification codes (e.g., production serial numbers), i.e., individual IDs, and individual user identification codes, i.e., user IDs, into industrial systems. However, no PDAs capable of meeting the demand have been available in the art.

Non-contact card systems such as bank card systems usually output only predetermined codes such as account numbers, but do not offer a function to allow users to select and output codes.

There have been not available any systems in which PDAs and entertainment systems are combined for connection to industrial systems.

SUMMARY OF THE INVENTION

It is therefore an object of the present invention to provide a portable information communication terminal and an entertainment system which are easily capable of being combined with industrial systems.

Another object of the present invention is to provide a portable information communication terminal and an entertainment system which allow a portable information communication terminal capable of receiving wireless signals and an entertainment apparatus to complement each other to create a new function.

Still another object of the present invention is to provide a portable information communication terminal, an entertainment system, and a storage medium which are capable of increasing the convenience of a portable information communication terminal and an entertainment apparatus.

According to an aspect of the present invention, a portable information communication terminal has a wireless signal receiver for receiving basic data relative to a particular code, and a code data converter for converting the basic data received by the wireless signal receiver into an optically readable code-related data. A display controller displays an optically readable particular code represented by the code-related data on the display screen of a display unit. The display unit of the portable information communication terminal can display the optically readable particular code corresponding to the received wireless signal.

According to another aspect of the present invention, a portable information communication terminal has a wireless signal receiver for receiving basic data relative to a particular code and related-information data including information related to the basic data, and a code data converter for converting the basic data received by the wireless signal receiver into an optically readable code-related data. The display controller displays an optically readable particular code represented by the code-related data and/or the related information data on the display screen of a display unit. The display unit of the portable information communication terminal can display the optically readable particular code corresponding to the received wireless signal and/or the related information data.

According to still another aspect of the present invention, a portable information communication terminal has a wireless signal receiver for receiving a plurality of basic data relative to a plurality of particular codes and a plurality of related-information data including information related to the plurality of basic data, respectively, a code data converter for converting the plurality of basic data received by the wireless signal receiver into respective optically readable code-related data, and a related-information selector for selecting a desired one of the plurality of related-information data displayed on the display screen. A display controller displays an optically readable particular code represented by the code-related data corresponding to the related-information data selected by the related-information selector, on the display screen of a display unit. Of the received plurality of related information data, an optically readable particular code relative to desired related information can automatically be selected on the display unit of the portable information communication terminal.

The code data converter may read the data relative to the individual identification code from a memory and converts the read data into optically readable individual identification code data when converting the basic data into the optically readable code-related data, and the display controller may display an optically readable individual identification code represented by the individual identification code data when displaying the optically readable particular code represented by the code-related data on the display screen of the display unit. Therefore, an individual identification code such as a product serial number or the like of the portable information communication terminal can be displayed as an optically readable code, as well as the optically readable particular code.

The code data converter may read the data relative to the user identification code from a memory and converting the read data into optically readable user identification code data when converting the basic data into the optically readable code-related data, and the display controller may display an optically readable user identification code represented by the user identification code data when displaying the optically readable particular code represented by the code-related data on the display screen of the display unit. Therefore, an identification code of the user of the portable information communication terminal can be displayed as an optically readable code, as well as the optically readable particular code.

The code data converter may read the data relative to the individual identification code and/or the data relative to the user identification code from the memory and converting the read data into optically readable individual identification code data and/or optically readable user identification code data when converting the basic data into the optically readable code-related data, and the display controller may display an optically readable individual identification code represented by the individual identification code data and/or an optically readable user identification code represented by the user identification code data when displaying the optically readable particular code represented by the code-related data on the display screen of the display unit.

The optically readable particular code may comprise a bar code. The bar code can be read by a bar-code reader which is part of the infrastructure of an existing store.

The bar code may comprise a bar code for use in discounting an article for sale. When the user takes the portable information communication terminal to the store, the user can purchase the article at a discount price, and hence can find the portable information communication terminal highly convenient to use.

An entertainment system according to an aspect of the present invention has an entertainment apparatus for reading and executing a program stored in a detachable storage medium, a display unit connected to the entertainment apparatus, for displaying an image, and a portable information communication terminal capable of receiving a wireless signal, for transmitting information to and receiving information from at least the entertainment apparatus. When the wireless signal is received by the portable information communication terminal, contents of the wireless signal are sent from the portable information communication terminal to the entertainment apparatus, and the entertainment apparatus reads data corresponding to the supplied contents of the wireless signal from the storage medium and displays an image represented by the read data on the display unit. With this arrangement, since the data corresponding to the supplied contents of the wireless signal received by the portable information communication terminal is displayed on the display unit, the entertainment system has a possibility to create a new business. The entertainment apparatus and the display unit may be integrally combined with each other or may be separate from each other.

If there are a plurality of data corresponding to the contents of the wireless signal received by the portable information communication terminal and supplied from the portable information communication terminal to the entertainment apparatus, then the entertainment apparatus may read the plurality of data from the storage medium and selectively display respective images represented by the read plurality of data on the display unit based on information from a manual controller. The user can select a desired image of plural images represented by the plural data corresponding to the contents of the wireless signal, with the manual controller.

If there are a plurality of data corresponding to the contents of the wireless signal received by the portable information communication terminal and supplied from the portable information communication terminal to the entertainment apparatus, then the entertainment apparatus may read the plurality of data from the storage medium and selectively display respective images represented by the read plurality of data on the display unit based on information from the portable information communication terminal. The user can select a desired image of plural images represented by the plural data corresponding to the contents of the wireless signal, with the portable information communication terminal. In this arrangement, no manual controller is required, and the entertainment apparatus and the portable information communication terminal may exchange information by way of wireless communications such as infrared communications.

An entertainment system according to another aspect of the present invention has an entertainment apparatus for reading and executing a program stored in a detachable storage medium, a display unit connected to the entertainment apparatus, for displaying an image, and a portable information communication terminal for transmitting information to and receiving information from the entertainment apparatus. The portable information communication terminal comprises a code data converter for converting basic data relative to a particular code stored in the storage medium and read by and supplied from the entertainment apparatus into an optically readable code-related data, a display unit having a display screen, and a display controller for displaying an optically readable particular code represented by the code-related data on the display screen of the display unit. The display unit of the portable information communication terminal that can be connected to the entertainment apparatus can display an optically readable particular code corresponding to basic data stored in the storage medium.

In the above entertainment system, the optically readable particular code may comprise a bar code. The bar code can be read by a bar-code reader which is part of the infrastructure of an existing store.

The bar code may comprise a bar code for use in discounting an article for sale. When the user takes the portable information communication terminal to the store, the user can purchase the article at a discount price, and hence can find the portable information communication terminal highly convenient to use.

A storage medium according to the present invention, which is detachably connected to an entertainment apparatus to which a portable information communication terminal capable of receiving a wireless signal can be connected, stores related-information data corresponding to data received as a wireless signal by the portable information communication terminal. When the portable information communication terminal and the entertainment apparatus are connected to each other, related-information data can be outputted from the entertainment apparatus to a display unit.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 23 is a flowchart of an operation sequence for displaying a bar code relative to a desired one of plural article discount data on the portable information communication terminal if a plurality of article discount data are contained in a mass-storage storage medium, without using a broadcasting system.

DESCRIPTION OF THE PREFERRED EMBODIMENTS

Figure 1:
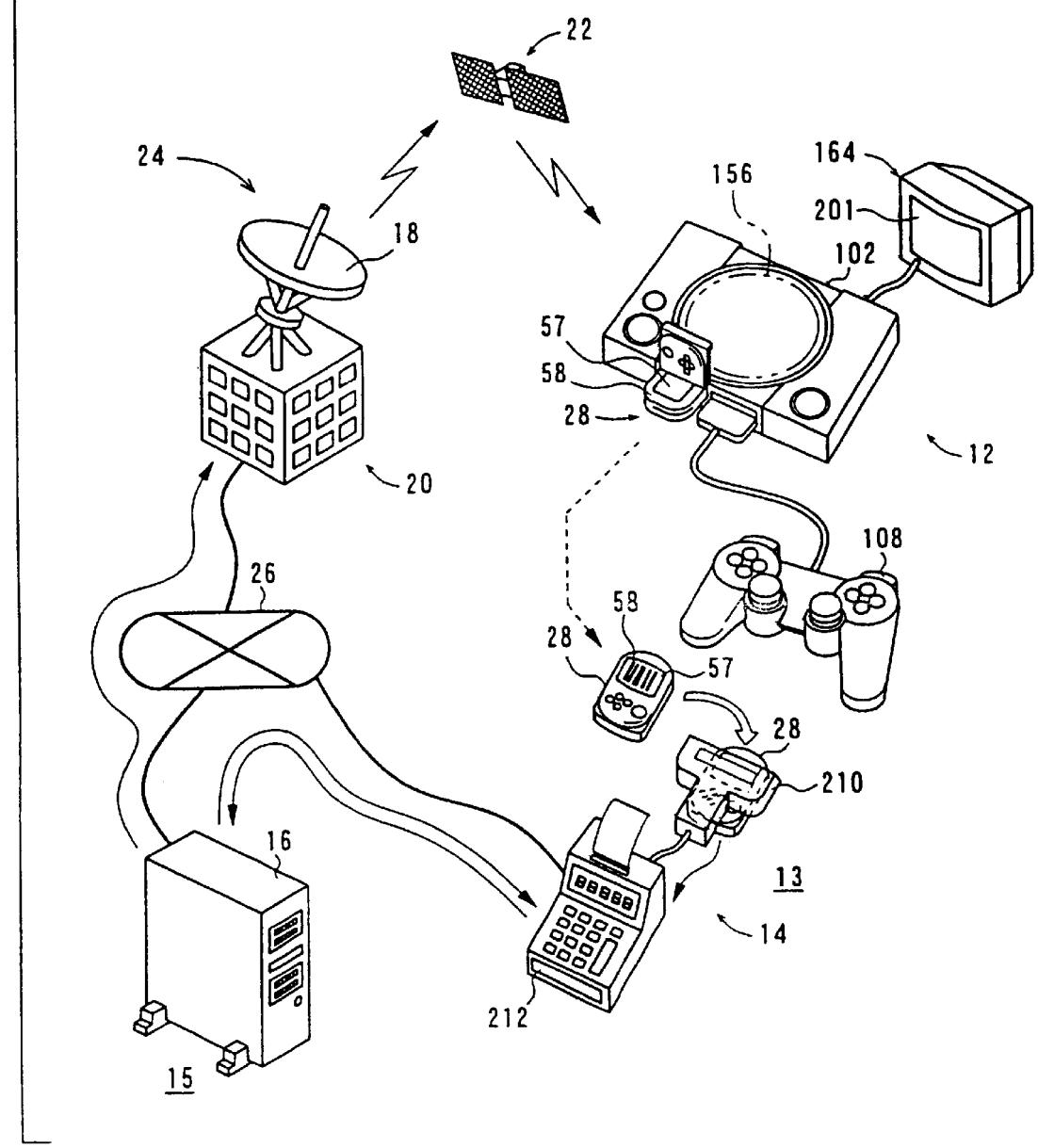
FIG. 1 is a schematic view showing a sales assistance system incorporating an entertainment system according to the present invention.

FIG. 1 schematically shows a sales assistance system 10 including an entertainment system 12 according to the present invention.

The sales assistance system 10 shown in FIG. 1 basically comprises an entertainment system 12 for the user to enjoy games, a POS (Point Of Sales) terminal 14 positioned at a convenience store (hereinafter also referred to as "CVS") 13 or the like, a central computer 16 positioned in the headquarters 15 of the convenience store 13, a transmitting station 20 having a broadcasting transmission antenna 18, and a communication satellite 22 having an antenna for reflecting wireless waves transmitted from the broadcasting transmission antenna 18 to the ground.

In FIG. 1, the transmitting station 20 and the communication satellite 22 jointly make up a broadcasting system 24 which utilizes the communication satellite 22. However, any of various other broadcasting systems as existing infrastructures including a wireless paging system, a television broadcasting system using ground waves, a satellite broadcasting system using a BS (Broadcasting Satellite) or a CS (Communication Satellite), a cable television system, etc.

Usually, there are a plurality of entertainment systems 12 located at a plurality of spots, and a plurality of POS terminals 14 located at a plurality of spots. The sales assistance system 10 may include a central computer for other convenience stores or supermarkets and a plurality of POS terminals connected to the central computer.

In FIG. 1, the POS terminal 14 at the CVS 13 and the central computer 16 in the CVS headquarters 15 are connected online on a real-time basis to each other via a circuit network 26 for bidirectional communications therebetween. The central computer 16 and the transmitting station 20 are connected online, but not necessarily online, to each other via the circuit network 26.

The entertainment system 12 comprises an entertainment apparatus 102 to which a portable information communication terminal 28 is detachably connected, a manual controller 108 connected to the entertainment apparatus 102, and a display monitor 164 connected to the entertainment apparatus 102. The display monitor 164 may be a television receiver. The entertainment apparatus 102, the manual controller 108, and the display monitor 164 may be integrally combined with each other.

Figure 2:
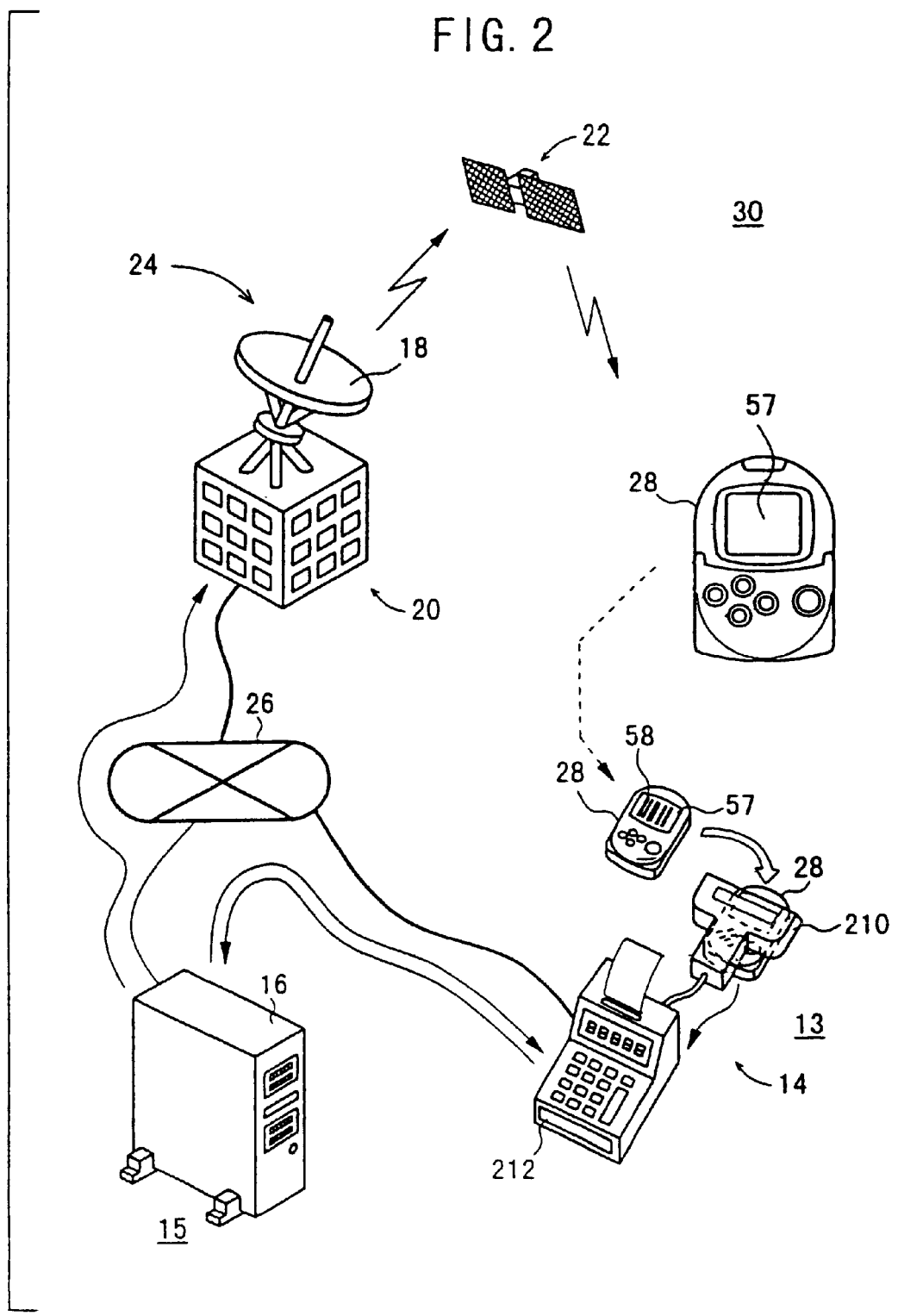
FIG. 2 is a schematic view showing another sales assistance system incorporating the portable information communication terminal according to the present invention.

FIG. 2 schematically shows another sales assistance system 30 incorporating the portable information communication terminal 28 according to the present invention. The sales assistance system 30 employs the portable information communication terminal 28 independently, i.e., employs the portable information communication terminal 28 which is carried by the user. The sales assistance system 10 shown in FIG. 1 and the sales assistance system 30 shown in FIG. 2 have identical components except for the entertainment system 12 including the portable information communication terminal 28.

In FIGS. 1 and 2, the POS terminal 14 comprises a code reader 210 for optically reading particular codes such as bar codes and/or alphanumeric characters or the like displayed on a display screen 57 of the portable information communication terminal 28, and a store computer 212 doubling as a cash register for calculating a total amount of money based on code information read by the code reader 210 and count information entered from a keyboard, and sending the code information, the count information, or the amount-of-money information as online data via the circuit network 26 to the central computer 16.

The central computer 16 transmits article information, etc. via the circuit network 26 to the store computer 212, and also transmits instructions via the circuit network 26 to the transmitting station 20 for broadcasting basic data (also referred to as "code-related data") such as bar code data corresponding to one or more articles for sale, and related information data (also referred to as "additional information data") including image information, etc. of an article or articles related to one or more basic data via the transmission antenna 18 of the transmitting station 20. The central computer 16 and the transmitting station 20 may be integrally combined with each other.

The basic data and the related information data (additional information data) or the basic data only is broadcast (as wireless waves) via the broadcasting system 24, and received by one or more portable information communication terminals 28 as one or more PDAs with a wireless reception function. In this embodiment, the basic data and the related information data (additional information data) or the basic data is transmitted as compressed data by way of wireless waves periodically and intermittently at fixed times everyday, for example.

Based on received information, the portable information communication terminal 28 expands received compressed data and displays a particular code such as a bar code and/or a alphanumeric characters or the like (also referred to as "basic code"), which are optically readable, corresponding to the basic data on the display screen 57.

Figure 3:
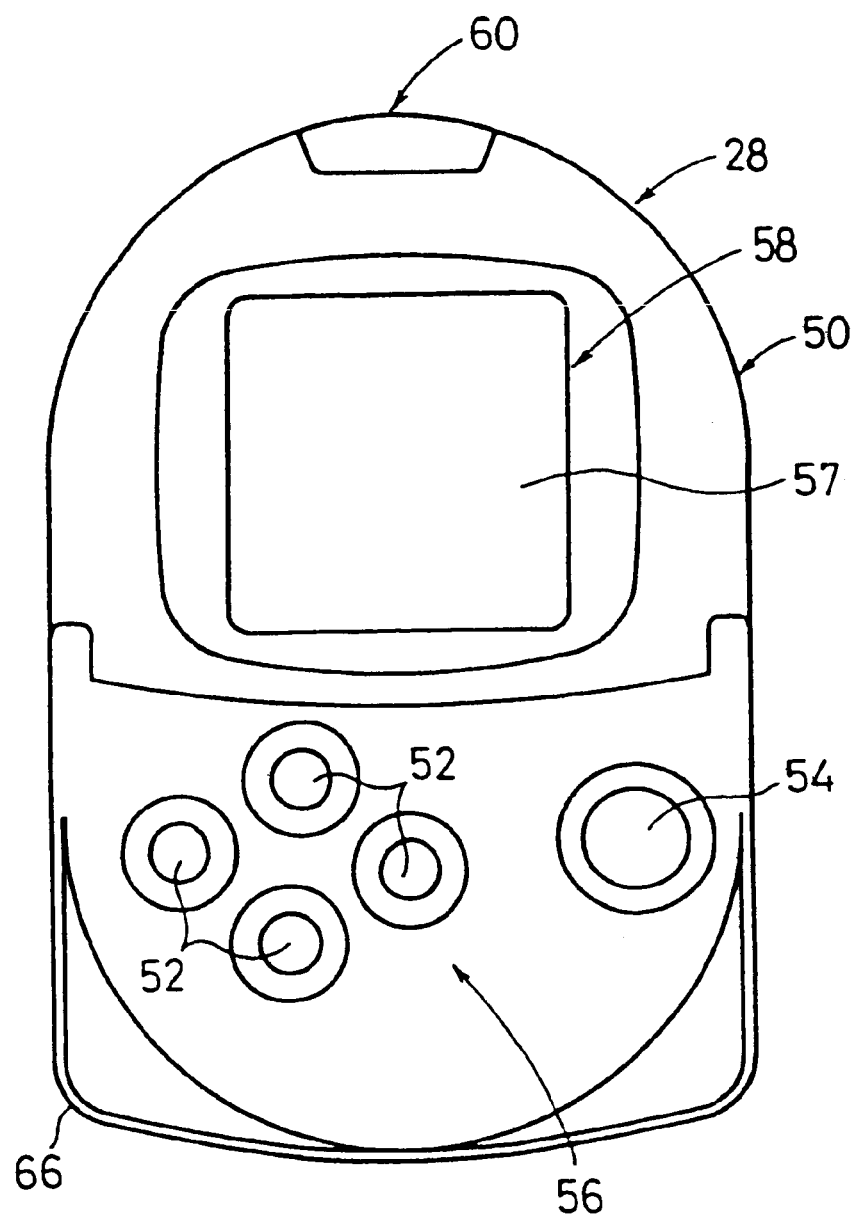
FIG. 3 is a plan view of the portable information communication terminal.
Figure 4:
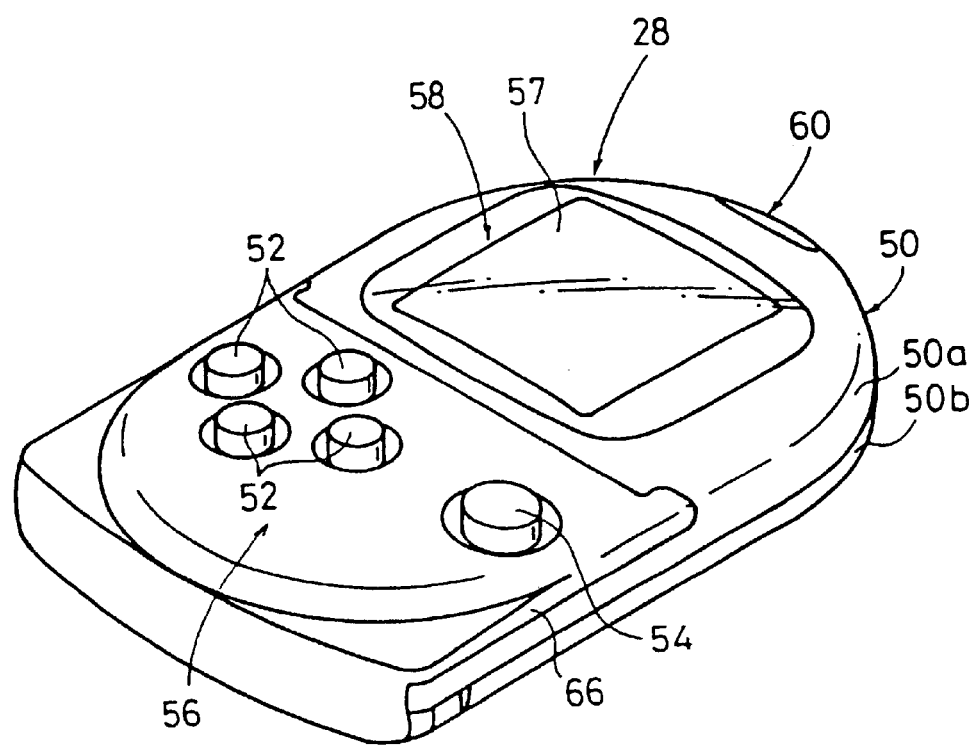
FIG. 4 is a perspective view of the portable information communication terminal.
Figure 5:
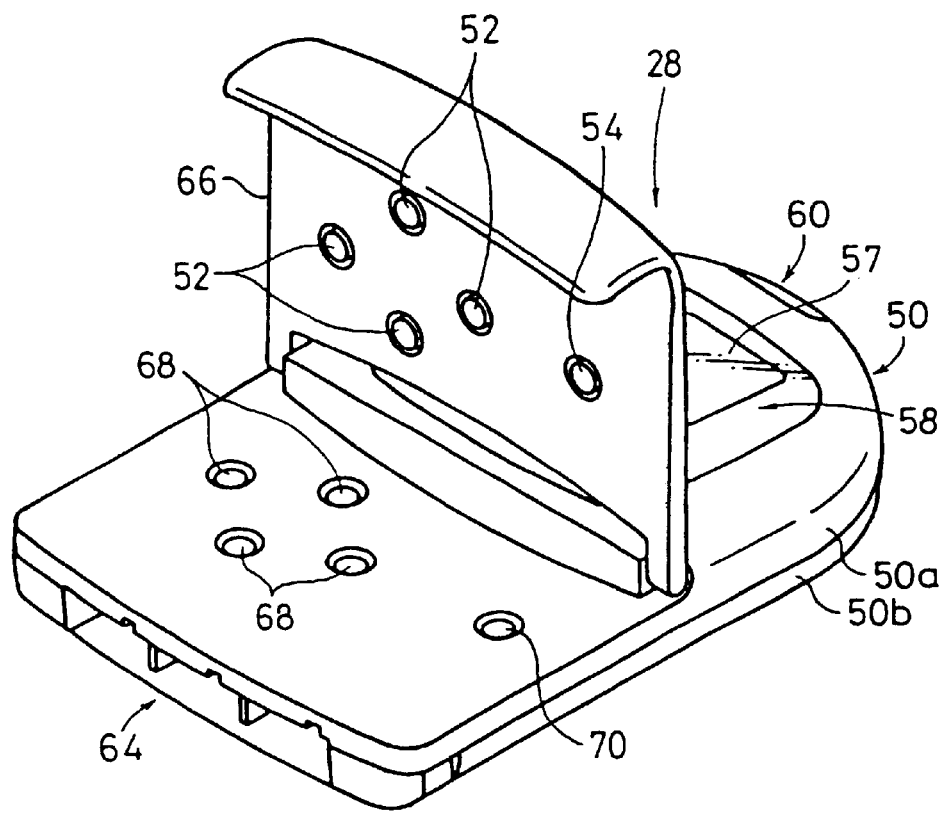
FIG. 5 is a perspective view of the portable information communication terminal with a lid being open.

FIGS. 3 through 5 show the portable information communication terminal 28. As shown in FIGS. 3 through 5, the portable information communication terminal 28 has a housing 50 which supports a manual control pad 56 having a plurality of direction buttons 52 and a decision button 54 for entering events and making various selections, a display unit 58 comprising a liquid crystal display (LCD) unit or the like which has the display screen 57, a window 60 for wireless communication via infrared radiation or the like, and a wireless antenna (not shown) for receiving wireless signals from the communication satellite 22. As described later on, the manual controller 56 also functions as a related information selector for selecting desired related information from a plurality of pieces of related information displayed on the display screen 57.

As shown in FIGS. 4 and 5, the housing 50 comprises an upper shell 50a and a lower shell 50b, and houses a board which supports a CPU, a memory device, etc. thereon.

The manual control pad 56 occupies a substantially half area of the upper shell 50a, and is positioned remotely from the window 60. The manual control pad 56 comprises a substantially square lid 66 that is angularly movably supported on the housing 50 and supports thereon the direction buttons 52 and the decision button 54, and switch pressers 68, 70 positioned in an area of the housing 50 which can be opened and closed by the lid 66. The housing 50 has a connector 64 at an end of the manual control pad 56.

The direction buttons 52 and the decision button 54 extend through the lid 66. The direction buttons 52 and the decision button 54 are supported on the lid 66 for movement into and out of the upper surface of the lid 66. The switch pressers 68, 70 have respective pressing elements supported on the housing 50 for movement into and out of the upper surface of the housing 50. When one of the pressing elements is pressed from above, it presses a corresponding pressure switch such as a diaphragm switch, for example, mounted on the unillustrated board in the housing 50.

With the lid 66 closed, the switch pressers 68, 70 are held in vertical alignment with the direction buttons 52 and the decision button 54, respectively. Therefore, while the lid 66 is being closed over the housing 50, when the direction buttons 52 and the decision button 54 are pressed from above into the upper surface of the lid 66, the direction buttons 52 and the decision button 54 cause the pressing elements of the corresponding switch pressers 68, 70 to press corresponding pressure switches in the housing 50.

Figure 6:
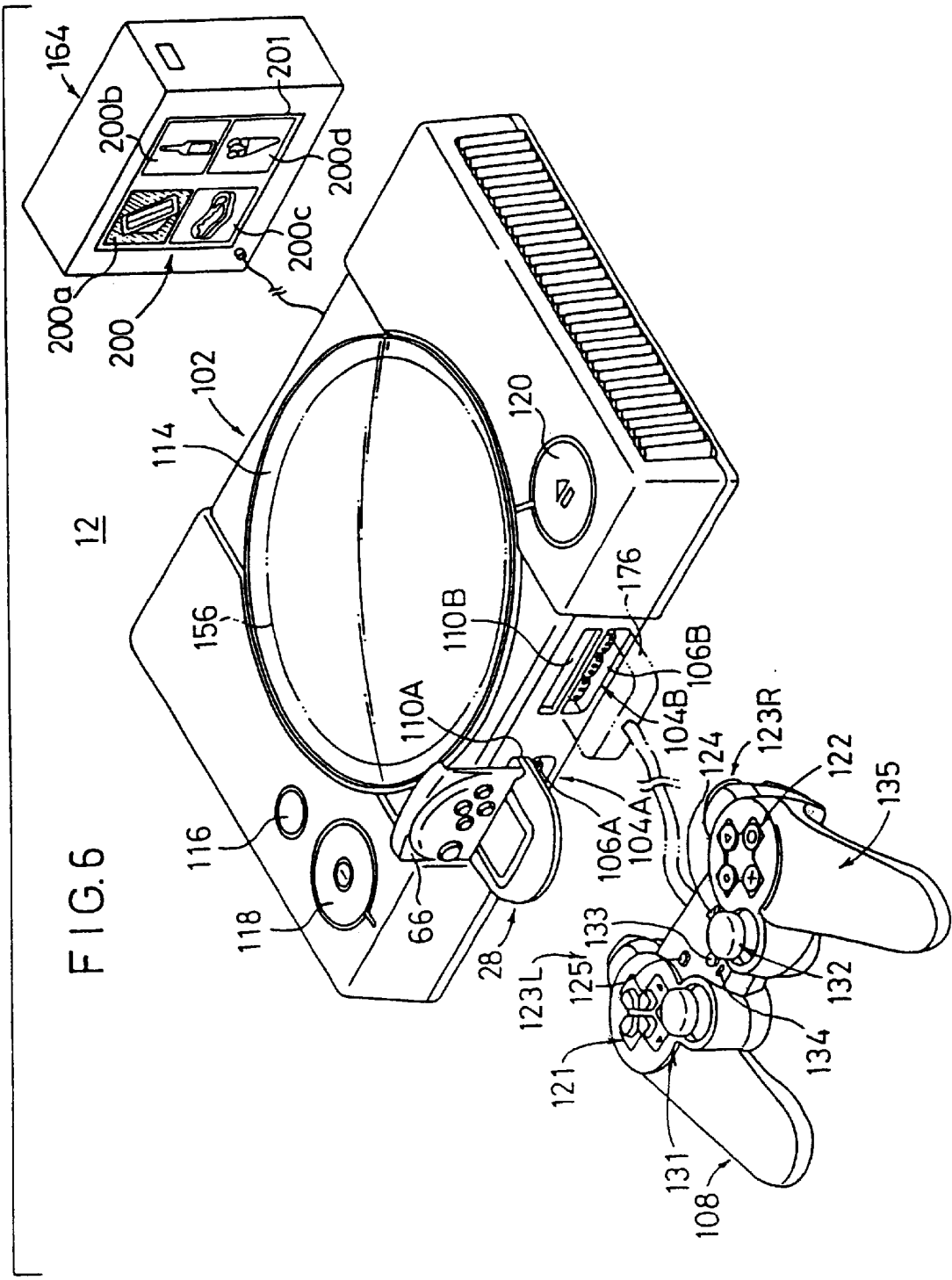
FIG. 6 is a perspective view of the entertainment system.

FIG. 6 shows in perspective the entertainment system 12 in use with the portable information communication terminal 28 connected thereto.

As shown in FIG. 6, the entertainment system 12 includes an entertainment apparatus 102 which serves as a master unit for the portable information communication terminal 28, the manual controller 108 detachably inserted in one of lower insertion units 106A, 106B in two slots 104A, 104B, the portable information communication terminal 28 detachably inserted in one of upper insertion units 110A, 110B in the slots 104A, 104B, and the display monitor 164 such as a television receiver which is supplied with video and audio output signals from the entertainment apparatus 102. Although not shown, a memory card containing a flash memory or the like for recording interim data of a game that is being played may be inserted into the upper insertion units 110A, 110B. The portable information communication terminal 28 also functions as a memory card.

The entertainment apparatus 102 has a disk loading unit 114 for loading an optical disk 156 as a storage medium such as a DVD, a CD-ROM, or the like, a reset switch 116, a power supply switch 118, a disk control switch 120 for controlling the loading of the optical disk 156, and the two slot 104A, 104B.

The manual controller 108, which is connected to the entertainment apparatus 102, has first and second control pads 121, 122, an L button 123L, an R button 123R, a start button 124, and a selection button 125. The manual controller 108 also has control pads 131, 132 for making analog control actions, a mode selection switch 133 for selecting control modes of the control pads 131, 132, and an indicator 134 for indicating a selected control mode. The above elements of the manual controller 108, except for the indicator 134, are collectively referred to as a control key assembly 135 for an easier understanding.

The entertainment apparatus 102 can read a program recorded in the optical disk 156 or the like with the disk loading unit 114, and execute a game, for example, based on the program depending on commands supplied from the user, e.g., the game player, via the manual controller 108, with the assistance of images displayed on and sounds produced by the display monitor 164. The execution of the game mainly represents controlling the progress of the game and the display of images and the generation of sounds.

The entertainment apparatus 102 reads data (related information data or the like) corresponding to a wireless signal received by the portable information communication terminal 28 from the optical disk 156, and reproduces contents (images) 200 (images 200a, 200b, 200c, 200d in FIG. 6) based on one or more of the read content data on a display screen 201 of the display monitor 164. The user can select any desired one of the reproduced images 200 with the manual controller 108.

Figure 7:
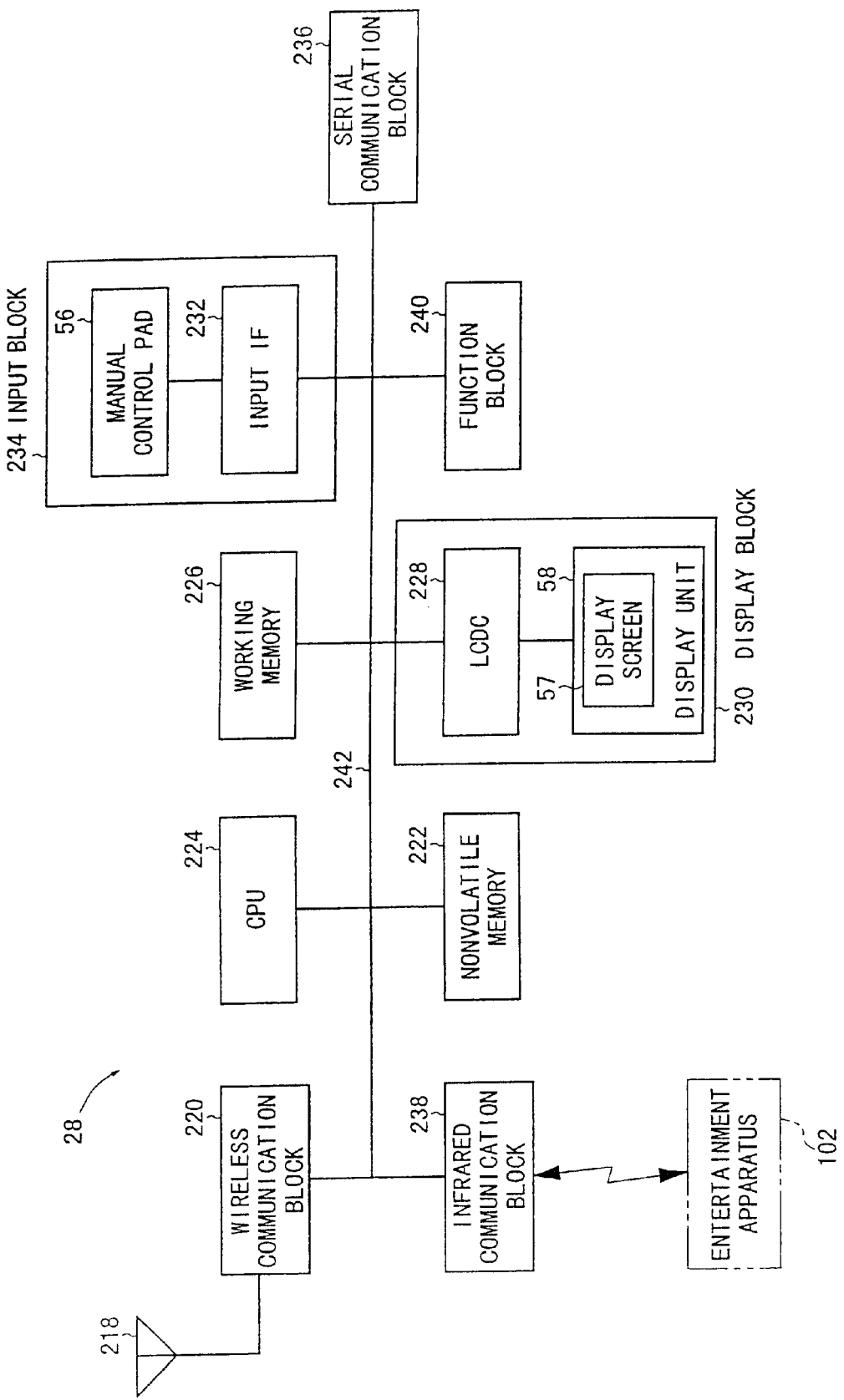
FIG. 7 is a block diagram of the portable information communication terminal.

FIG. 7 shows in block form an electric circuit of the portable information communication terminal 28. As shown in FIG. 7, the portable information communication terminal 28 basically functions as a computer, and has a wireless communication block 220 as a wireless signal receiver for receiving wireless signals such as microwave signals or the like transmitted from the broadcasting system 24 via an antenna 218.

The portable information communication terminal 28 also has a nonvolatile memory 222 comprising a flash memory or the like as a storage medium compatible with a memory card.

The portable information communication terminal 28 also has a CPU 224 for executing a program and data stored in the nonvolatile memory 222 on the portable information communication terminal 28, and a working memory 226. As described later on, the CPU 224 also functions as a code data converter for converting basic codes (code-related data) as basic code data received by the wireless communication block 220 into code-related data such as bar code data that can be optically read.

The portable information communication terminal 28 further includes a display block 230 comprising a liquid crystal display controller (LCDC) 228 which also functions as a display controller together with the CPU 224 and the display unit 58 having the display screen 57, an input block 234 comprising the manual controller 56 and an input interface (input IF) 232 for the manual controller 56, a serial communication block 236 for effecting serial communications with the entertainment apparatus 102 via a physical connector, an infrared communication block 238 for effecting infrared communications with another portable information communication terminal 28 or the entertainment apparatus 102, and a function block 240 for performing other functions than the above blocks, which may include a power supply function, for example. These blocks 220, 238, 224, 222, 226, 230, 234, 240, 236 are connected to each other by a bus 242. The infrared communication block 238 also functions as a wireless signal receiver.

The display screen 57 of the display unit 58 has a video image resolution and the number of display colors that make it possible for displayed bar codes to be optically read, so that a bar code and an image and characters representing an article sample which are displayed as a particular code on the display screen 57 can be read by the code reader 210 of the POS terminal 14.

The nonvolatile memory 222 stores identification codes of information that can be received, as data. When data is received by the wireless communication block 220, the portable information communication terminal 28 compares the identification code contained in the header of the received data with the stored identification codes, reads the received data only when the compared identification codes agree with each other, and stores the read data via the working memory 226 into the nonvolatile memory 222. The nonvolatile memory 222 also stores data relative to an individual PDA identification code (e.g., production serial number), i.e., an individual ID, and an individual user identification code, i.e., a user ID, that is entered by the user of the portable information communication terminal 28.

Figure 8:
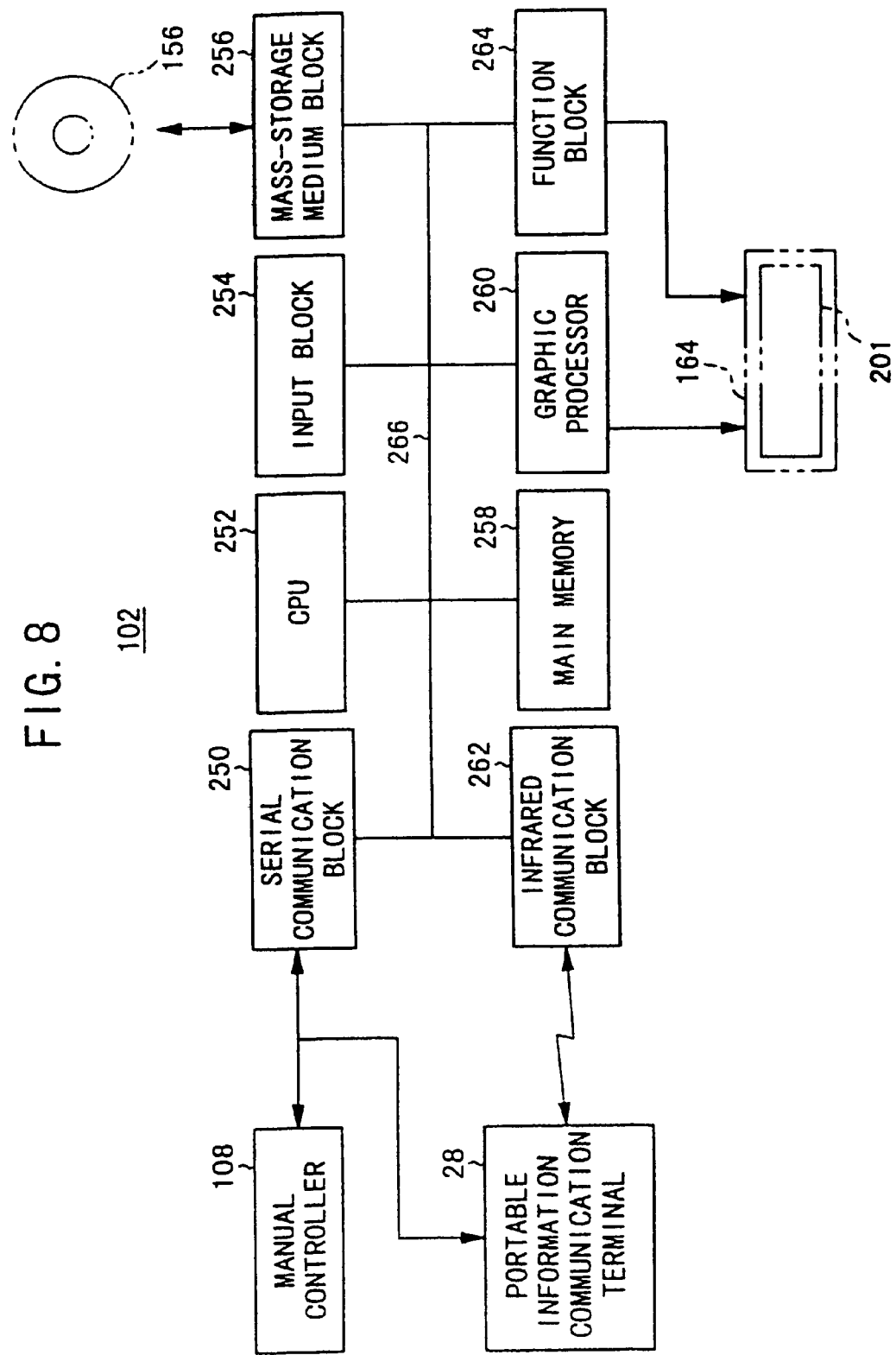
FIG. 8 is a block diagram of an entertainment apparatus.

FIG. 8 shows in block form an electric circuit of the entertainment apparatus 102. As shown in FIG. 8, the entertainment apparatus 102 has a serial communication block 250, an infrared communication block 262, a CPU 252, an input block 254, a mass-storage medium block 256, a main memory 258, a graphic processor 260, and a function block 264. These blocks are connected to each other by a bus 266.

The input block 254 functions as a manual input controller for allowing the user to enter various items of information into the entertainment apparatus 102.

The main memory 258 serves as a memory means for storing various data. For example, the main memory 258 stores application software, data transmitted from the portable information communication terminal 28 and the manual controller 108 via the serial communication block 250, and data transmitted from the portable information communication terminal 28 via the infrared communication block 262.

The graphic processor 260 serves as a processor for processing image data. For example, the graphic processor 260 performs graphic processing, e.g., polygon graphic processing, for images to be displayed on the display screen 201 of the display monitor 164.

The mass-storage medium block 256 serves as a unit for reading various programs or data recorded in the optical disk 156, as a mass-storage package medium.

The serial communication block 250 has a function to effect serial communications with an external device. The serial communication block 250 is electrically connectable to the serial communication block 236 of the portable information communication terminal 28 and a serial communication block of the manual controller 108 for data communications with the portable information communication terminal 28 and the manual controller 108.

The function block 264 is arranged to perform other functions than the above blocks, and may comprise a power supply block or a connection block for connection to the memory card as a storage medium and the portable information communication terminal 28, for example.

The CPU 252 functions to control the above blocks 250, 262, 258, 254, 260, 256, 264.

Figure 9:
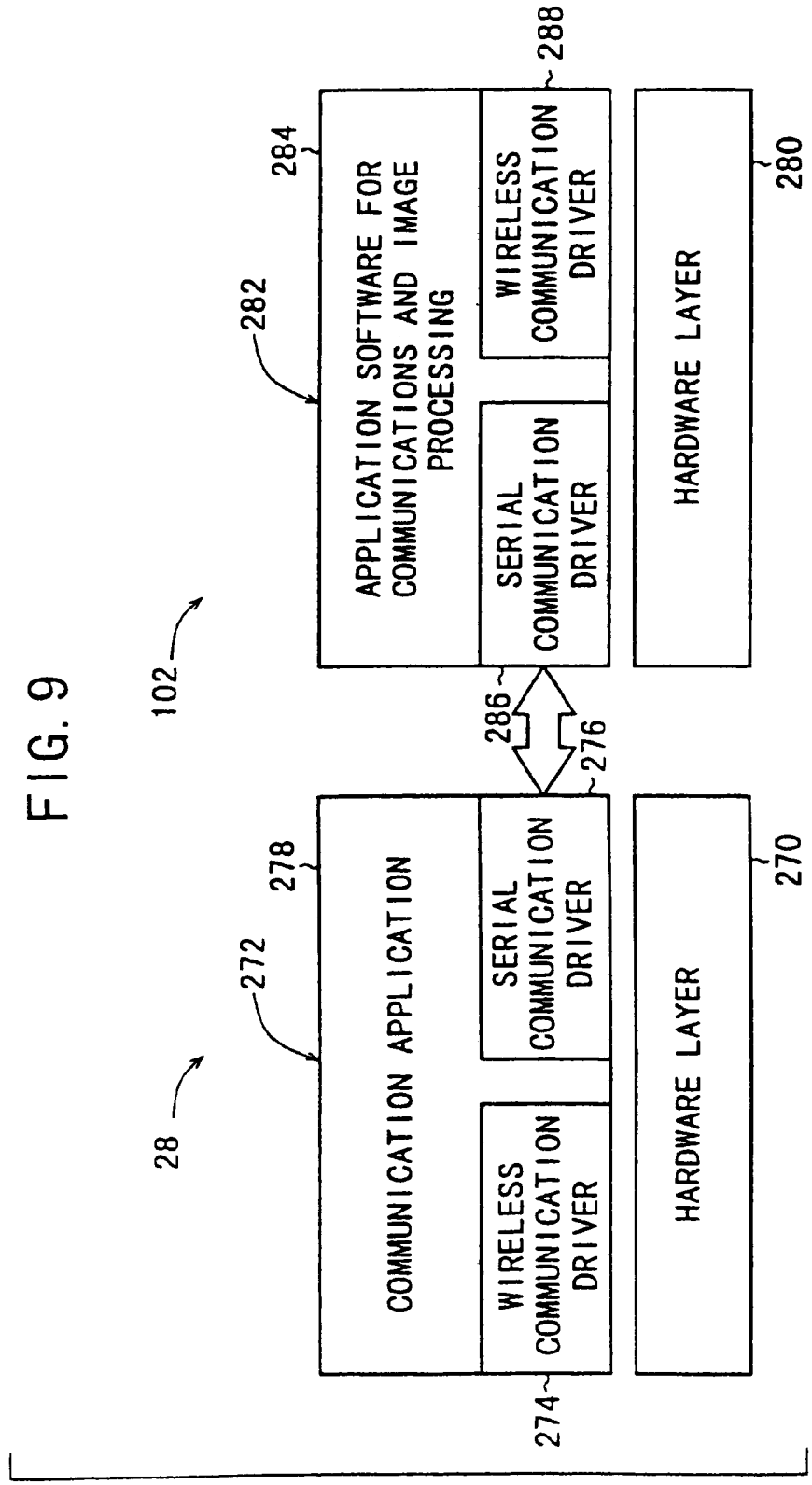
FIG. 9 is a logic diagram showing the logic relationship between the entertainment apparatus and the portable information communication terminal connected thereto.

FIG. 9 shows the logic relationship between the entertainment apparatus 102 and the portable information communication terminal 28 connected thereto. As shown in FIG. 9, the portable information communication terminal 28 comprises a hardware layer 270 (including the antenna 218) for processing data received via the antenna 218 (see FIG. 7), and a software layer 272 for performing communications in the hardware layer 270, the software layer 272 comprising a wireless communication driver 274, a serial communication driver 276, and a communication application 278.

As shown in FIG. 7, the hardware layer 270 of the portable information communication terminal 28 comprises the blocks including the CPU 224 and the wireless communication block 220 which are connected to the bus 178. The wireless communication block 220 receives data with the wireless communication driver 274 which comprises a program. The CPU 224 has a function to control the above blocks, e.g., to control the blocks according to various programs including the communication application 278 of the software layer 272.

As shown in FIG. 9, the entertainment apparatus 102 comprises a hardware layer 280 and a software layer 282 comprising application software 284 for controlling the hardware layer 280 and performing communications and image processing, and a serial communication driver 286 and a wireless communication driver 288 included in the application software 284.

As shown in FIG. 8, the hardware layer 280 of the entertainment apparatus 102 comprises the blocks including the CPU 252 and the serial communication block 250 which are connected to the bus 266. The serial communication block 250 is controlled for its communications by the serial communication driver 286 and the wireless communication driver 288.

The entertainment apparatus 102 and the portable information communication terminal 28 are physically connected to each other between the connector 64 (see FIG. 5) of the portable information communication terminal 28 and the connector (not shown) of the upper insertion unit 110A of the entertainment apparatus 102. Of course, the entertainment apparatus 102 and the portable information communication terminal 28 can electrically be connected to each other in a wireless fashion between their infrared communication blocks 262, 238.

Operation of the sales assistance systems 10, 30 including the entertainment apparatus 102 and the portable information communication terminal 28 as shown in FIGS. 1 and 2 will be described below.

Overall operation of the sales assistance systems 10, 20 will first be described below. In the sales assistance systems 10, 30 shown in FIGS. 1 and 2, article information transmitted intermittently and periodically as compressed data by way of a wireless signal from the convenience store headquarters 15 via the circuit network 26, the transmitting station 20, the transmission antenna 18, and the communication satellite 22 is received by the portable information communication terminal 28 via the antenna 218 and the wireless communication block 220.

The received article information is used as a substitute for a coupon for discounting an article for sale. When the article information is presented to the CVS 13 by the user of the portable information communication terminal 28 using the portable information communication terminal 28 at the time the user purchases the article, the user can purchase the article at a discount price at the CVS 13.

Specifically, the code reader (optical scanner) 210 of the POS terminal 14 at the CVS 13 reads a particular code such as a bar code, which is a substitute for a coupon, displayed on the display screen 57 of the portable information communication terminal 28, and enters the read code into thee store computer 212. The store computer 212 sends and receives code-related data to and from the central computer 16 in the CVS headquarters 15 online on a real-time basis.

Specific details of the operation of the sales assistance systems 10, 30 will be described below.

Figure 10:
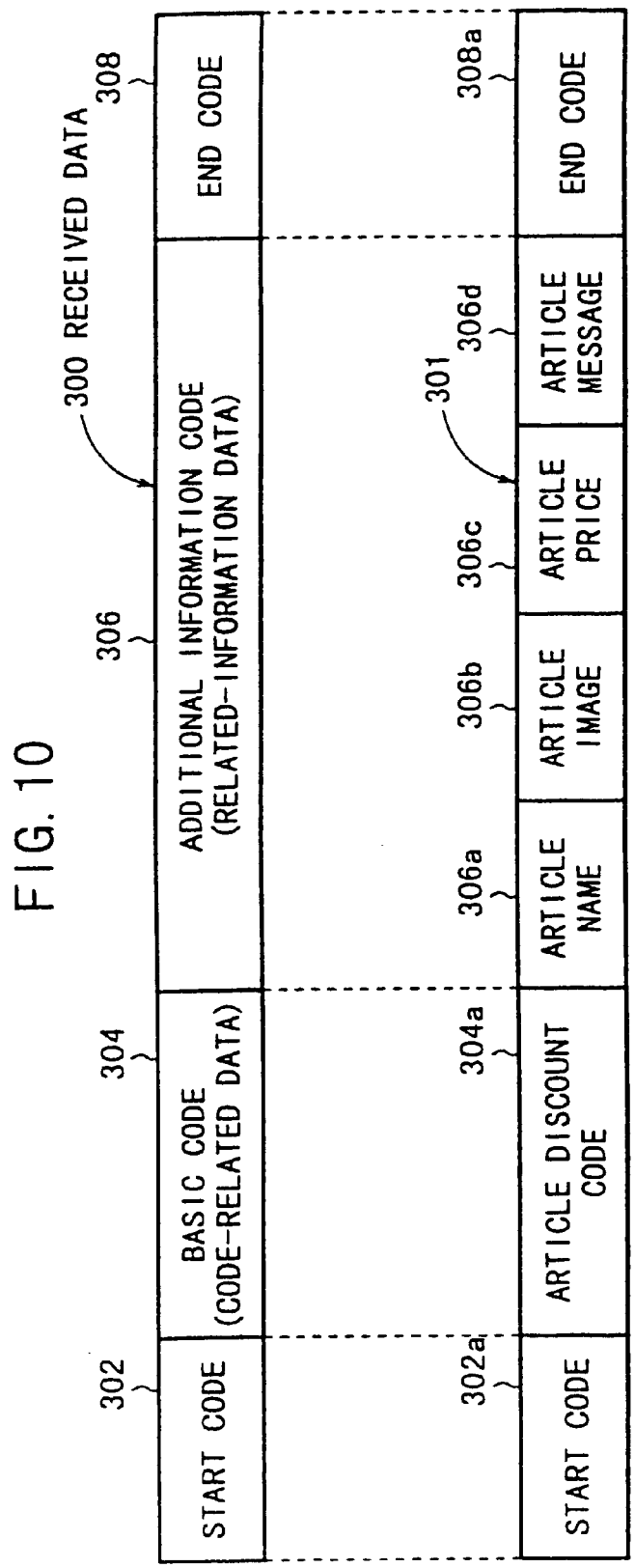
FIG. 10 is a diagram showing the contents of received data including basic data and additional information data.

FIG. 10 shows a general format of received data 300 transmitted as a wireless signal from the transmitting station 20 via the transmission antenna 18 and the communication satellite 22 and received by the portable information communication terminal 28 via the antenna 218 and the wireless communication block 220. FIG. 10 also shows a specific data format 301 of the received data 300.

The received data 300 includes a start code 302, a basic code (code-related data) 304 as basic data following the start code 302, an additional information code (related-information code) 306 as related-information data including information related to the basic data following the basic code 304, and an end code 308 following the additional information code 306.

As indicated by the specific data format 301, the start code 302 includes a start code 302a representing a synchronizing signal for reception, and the basic code 304 includes an article discount code 304a as code-related data which can be optically read. The article discount code 304a is indicated as a code or a number.

The additional information code 306 includes article name data 306a representing the name of the article, article image data 306b representing the image of the article, article price data 306c representing the price of the article (discount price), and article message data 306d characterizing the article. The additional information code 306 comprises image information and/or audio information. Since the article image data 306b actually comprises a large amount data, it is transmitted as compressed data.

The end code 308 includes a code representing the end of the received data 300 and a phase compensation signal, etc.

Figure 11:
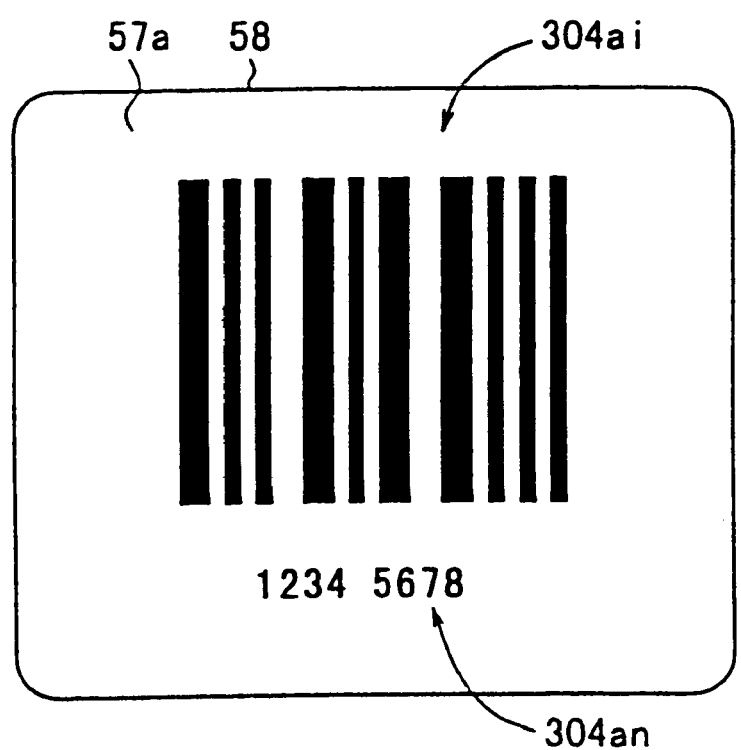
FIG. 11 is a view showing a displayed image of a bar code on the portable information communication terminal.

FIG. 11 shows an article discount code 304ai which expresses the article discount code 304a (see FIG. 10) as a bar code and an article discount code 304an which expresses the article discount code 304a as a number, as an example of optically readable code-related data which is displayed as graphic data on the display screen 57 (referred to as "displayed image 57a" when it displays the codes shown in FIG. 11) of the display unit 58 of the portable information communication terminal 28. The article discount code 304an expressed as a number can be considered as optically readable code-related data.

Figure 12:
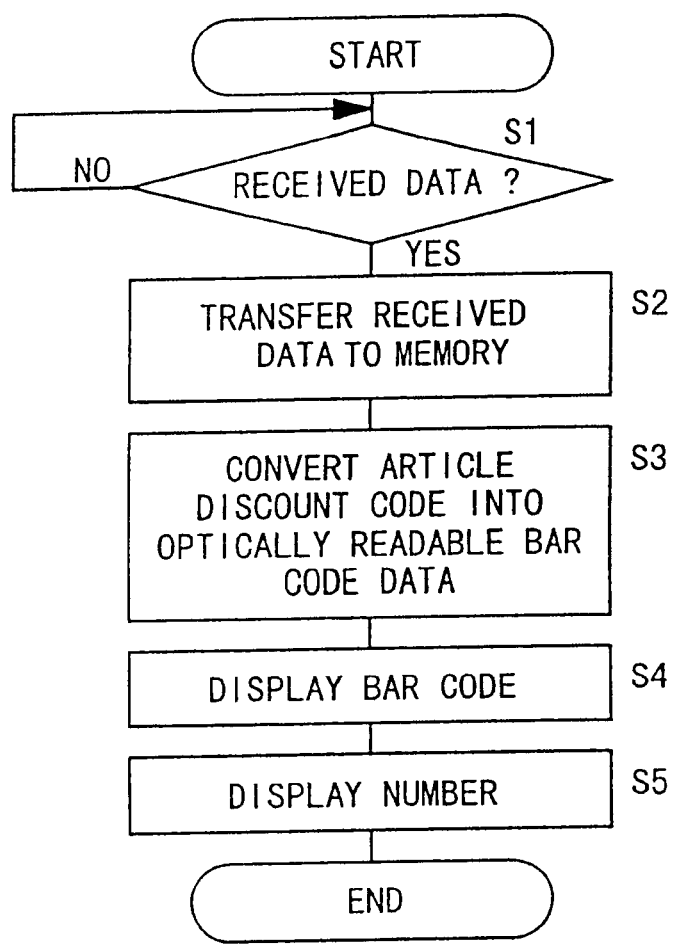
FIG. 12 is a flowchart of an operation sequence for displaying a bar code on a display screen of the portable information communication terminal.

FIG. 12 is a flowchart of an operation sequence for converting the article discount code 304a of the basic code 304 of the received data 300 into optically readable data and displaying the data on the display screen 57 of the portable information communication terminal 28.

When the portable information communication terminal 28 which is connected to the entertainment apparatus 102 as shown in FIG. 1 or which is used as a stand-alone device as shown in FIG. 2 is turned on and capable of receiving wireless signals, the CPU 224 intermittently or continuously confirms in step S1 whether there is received data 301 in the wireless communication block 220 as a wireless signal receiver or not.

If YES in step S1, i.e., if there is received data 301 in the wireless communication block 220, then the CPU 224 transfers the received data 301 to the working memory 226 in step S2.

In step S3, the CPU 224 reads the basic code 304, i.e., the article discount code 304a, from the received data 301, and converts the article discount code 304a into bar code data as optically readable code-related data. At this time, the CPU 224 functions as a code data converter for converting basic code data received by the wireless communication block 220 into optically readable code-related data.

Another code data converter may be employed which comprises a decoder in the wireless communication block 220 for converting the basic code data received by the wireless communication block 220 into optically readable code-related data. A converting algorithm may be any algorithm compatible with the reading system, i.e., the system combined with the POS terminal 14 having the code reader 210 which comprises a bar-code reader, and is not limited to any particular algorithm.

In step S4, the CPU 224 transfers the optically readable code-related data, i.e., bar code data, to the LCDC 228, which displays the article discount code 304ai as a bar code in an upper area of the displayed image 57a on the display unit 58 shown in FIG. 11. In this manner, the CPU 224 and the LCDC 228, which jointly make up a display controller, display the article discount code 304ai as a optically readable bar code represented by the code-related data in the displayed image 57a on the display unit 58.

In step S5, the CPU 224 and the LCDC 228 also display the article discount code 304an expressed as a number in a lower area of the displayed image 57a on the display unit 58 shown in FIG. 11.

In the present embodiment, the article discount code 304an expressed as a number is displayed to let the user know the details of the article discount code 304ai as a bar code representation, and may not necessarily be required in the sales assistance system 10, 30 shown in FIGS. 1 and 2.

While the article discount code 304ai in the form of a bar code representation is used as the article discount code 304a in the illustrated embodiment, the article discount code 304ai is not limited to a bar code representation, but may be expressed as a different code representation such as a number of dots or dots in different sizes. Therefore, an algorithm for converting the received data 301 into optically readable code-related data with the CPU 224 as a code data converter may be any algorithm compatible with the reading system, and is not required to be any particular algorithm specific to the code reader 210, which is a bar-code reader, of the CVS 13.

Figure 13:
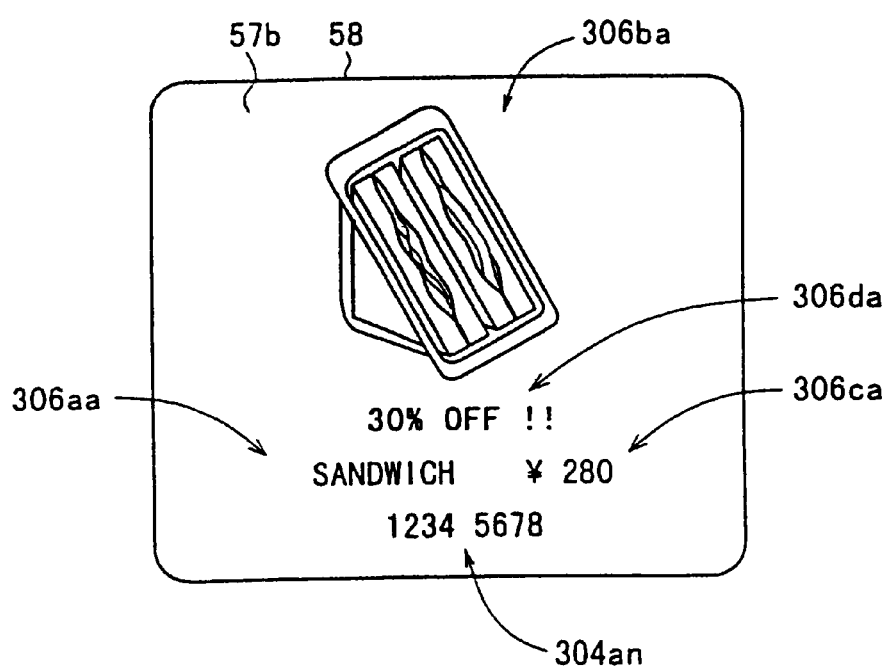
FIG. 13 is a view showing a displayed image of an article on the portable information communication terminal.

FIG. 13 shows the contents of the additional information code (related-information data) 306 in the received data 300, 301 shown in FIG. 10, as displayed on the display screen 57 (referred to as "displayed image 57*b*" when it displays the data shown in FIG. 13) of the portable information communication terminal 28. As described above, the additional information code (related-information data) 306 includes data corresponding to the details represented by the basic data (the article discount code 304*a*) of the basic code, and may be displayed on the display screen 57 of the display unit 58 when necessary or when the user operates the manual control pad 56 of the portable information communication terminal 28.

In FIG. 13, the display screen 57 displays "sandwich" as an article name 306*aa* based on the article name data 306*a* in the received data shown in FIG. 11, a color image in perspective of a sandwich as an article image 306*ba* based on the article image data 306*b* in the form of photographic article data, "30% OFF !" as discount information as an article message 306*da* based on the article message data 306*d*, and "¥280" as a discount price 306*ca* based on the article price data 306*c*. The Japanese expression may be replaced with another language expression such as an English expression. If the portable information communication terminal 28 is used in the United States, then the ¥ (yen) representation is replaced with a $ (dollar) representation.

The displayed image 57*a* shown in FIG. 11 and the displayed image 57*b* shown in FIG. 13 may alternately be switched around by operating the manual control pad 56, or may simultaneously be displayed as split images. In this sense, the manual control pad 56 serves as an image selector switcher.

Figure 14:
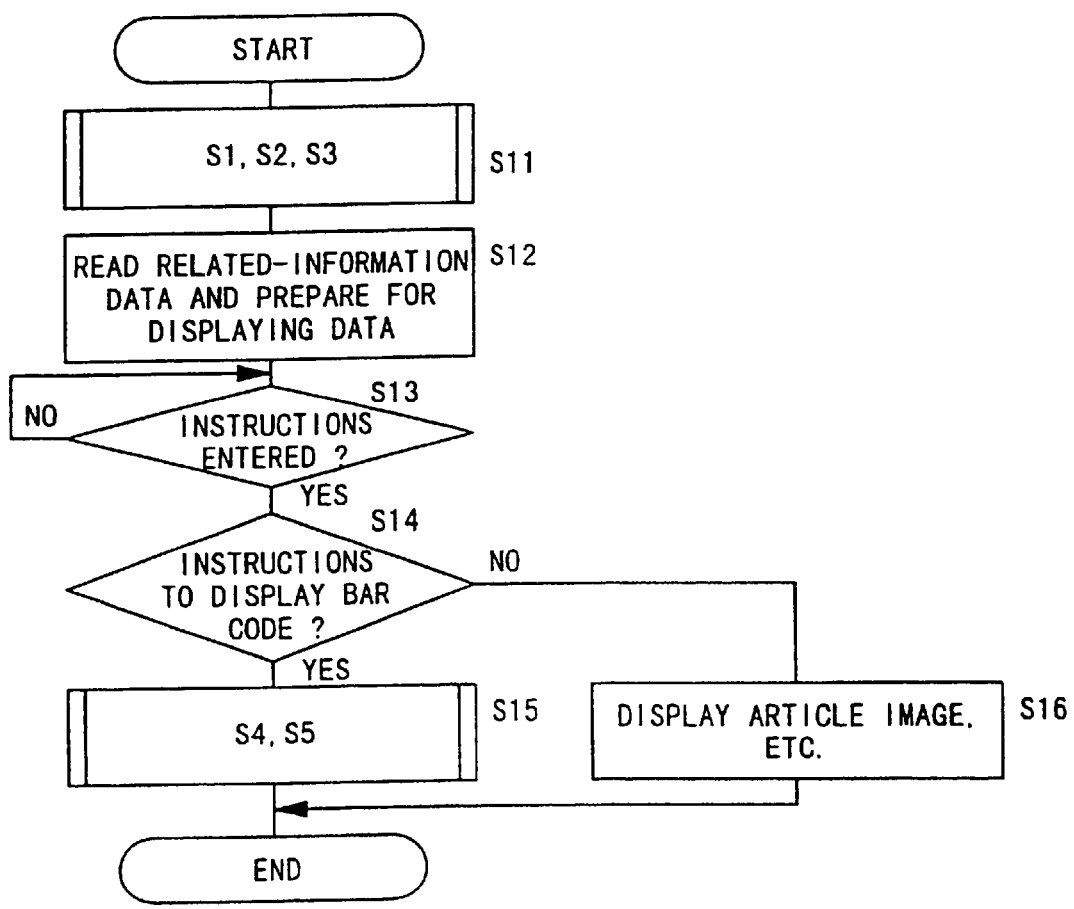
FIG. 14 is a flowchart of an operation sequence for displaying an article on the display screen of the portable information communication terminal.

FIG. 14 is a flowchart of an operation sequence for selecting the displayed images 57*a*, 57*b* based on instructions entered by the user.

In step S11 shown in FIG. 14, the processing in steps S1–S3 shown in FIG. FIG. 12 is carried out. Specifically, in step S1 shown in FIG. 12, the CPU 224 intermittently or continuously confirms whether there is received data 301 in the wireless communication block 220 as a wireless signal receiver or not. If there is received data 301 in the wireless communication block 220, then the CPU 224 transfers the received data 301 to the working memory 226 in step S2. In step S3, the CPU 224 reads the article discount code 304*a* from the received data 301, and converts the article discount code 304*a* into bar code data as optically readable code-related data.

In step S12, the CPU 224 reads the article name data 306*a*, the article image data 306*b*, the article price data 306*c*, and the article message data 306*d* as related-information data from the received data 300, 301, and prepares for making these data ready for being displayed.

In step S13, the CPU 224 confirms with the input block 234 whether there is data entered from the user via the manual control pad 56 or not.

If there is data entered from the user via the manual control pad 56, the CPU 224 confirms in step S14 whether the entered data is an instruction for displaying the article discount code 304*ai* as a bar code with respect to a basic code (code-related data) or not.

If the entered data is an instruction for displaying the article discount code 304*ai*, then the CPU 224 performs the processing in steps S4, S5 shown in FIG. 12 in step S15. Specifically, the CPU 224 transfers bar code data to the LCDC 228, which displays the article discount code 304*ai* as a bar code in the upper area of the displayed image 57*a* on the display unit 58 shown in FIG. 11. In step S5, the CPU 224 and the LCDC 228 also display the article discount code 304*an* expressed as a number in the lower area of the displayed image 57*a* (FIG. 11) together with the article discount code 304*ai*.

If the entered data is not an instruction for displaying the article discount code 304*ai*, but an instruction for displaying an related-information image (additional information image) such as the article image 306*ba*, then the CPU 224 displays in step S16 the article name 306*aa*, the article image 306*ba*, the article message 306*da*, the discount price 306*ca*, and the article discount code 304*an* expressed as a number, in the displayed image 57*b*. Since the article image data 306*b* representing the article image 306*ba* is compressed data, the article image data 306*b* is expanded by the CPU 224 for displaying the article image 306*ba* in the displayed image 57*b*. By transmitting a relatively large amount of data such as image data as compressed data from the transmitting station 20, the transmitting station 20 can transmit images on a real-time basis using a pager system or the like which has a relative small data transfer rate.

A process of processing a plurality of received data relative to different article discount codes will be described below. In this process, in order for the user to select an article discount code 304*a* to be displayed on the display screen 57 of the display unit 58, some additional information codes (related-information data) 306 of the received data 300 (301) are simultaneously displayed on the display screen 57 of the display unit 58.

Figure 15:
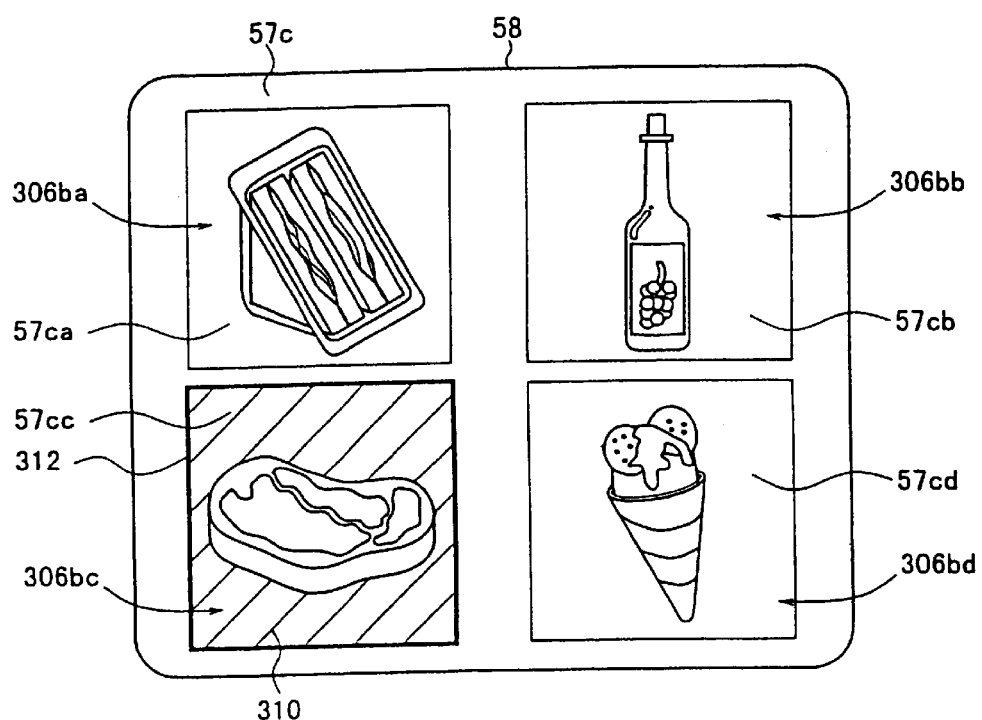
FIG. 15 is a view showing a displayed image of a plurality of articles on the portable information communication terminal.

FIG. 15 shows four article images based on the article image data 306*b* of plural additional information codes (related-information data) 306, i.e., an article image 306*ba* of sandwich, an article image 306*bb* of wine, an article image 306*bc* of meat, and an article image 306*bd* of ice cream, displayed simultaneously in split images 57*ca*, 57*cb*, 57*cc*, 57*cd*, respectively, in the displayed image 57*c* on the display unit 58. In the displayed image 57*c*, the article image 306*bc* of meat displayed in the split image 57*cc* having a background 310 in a different color shown as hatched in FIG. 15 and a thick image frame 312 represents a highlighted image selected by the user via the manual control pad 56.

Figure 16:
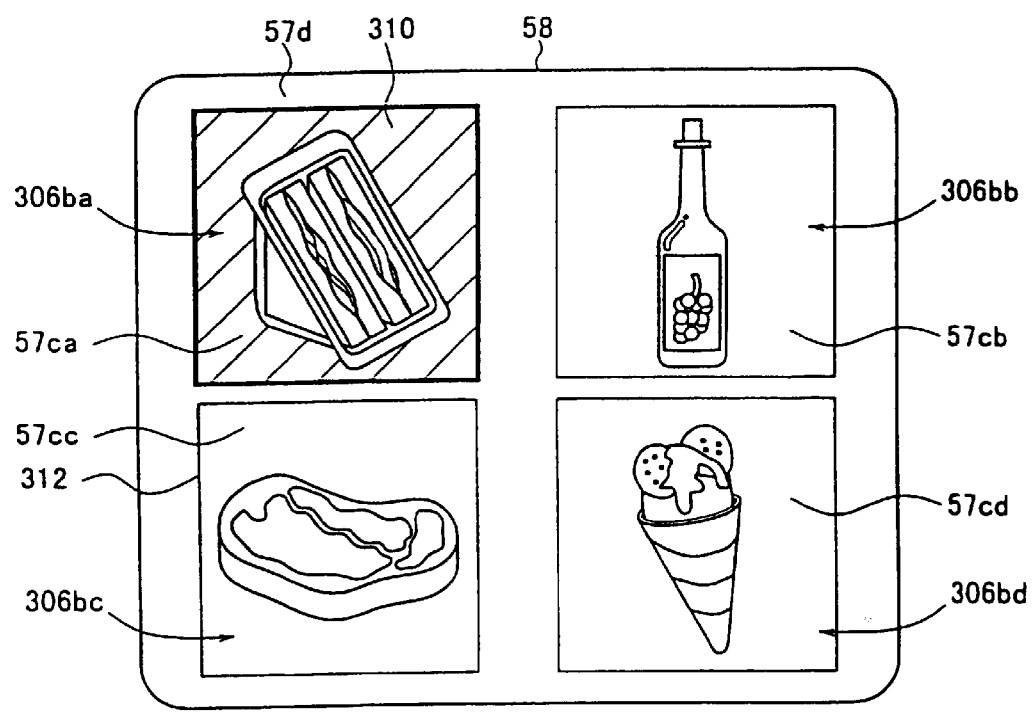
FIG. 16 is a view showing another displayed image of a plurality of articles on the portable information communication terminal.

The highlighted image can be scrolled by the manual control pad 56. For example, when the user shifts the highlighted image to the split image 57*ca* showing the article image 306*ba* of sandwich, the displayed image changes to a displayed image 57*d* shown in FIG. 16 which contains the highlighted article image 306*ba* of sandwich in the split image 57*ca* which has a background 310 in a different color and a thick image frame 312. When the user operates the manual control pad 56 to decide on the article image 306*ba*, the displayed image changes to the image 57*a* showing the article discount code 304*ai* in the form of an article discount bar code corresponding to the article image 306*ba* of sandwich.

When the user presents an article to be purchased and also the portable information communication terminal 28 which is displaying the article discount code 304*ai* in the form of an article discount bar code corresponding to the article to be purchased to the clerk in the CVS 13, the clerk reads the image 57a showing the article discount code 304ai with the code reader 210 (see FIGS. 1 and 2). The store computer 212 checks the article discount code 304ai against its own database. If the article discount code 304ai is not present in the database, then the store computer 212 checks a database in the central computer 16 at the CVS headquarters 15 on a real-time basis through the circuit network 26, and presents the article to the user at a discount price.

The additional information code (related-information data) displayed as a character image on the display screen 57 may include an article discount period expressed as a range of days, and information designating discounting stores. These article discount period and discounting stores may also be displayed on the display screen 57.

Figure 17:
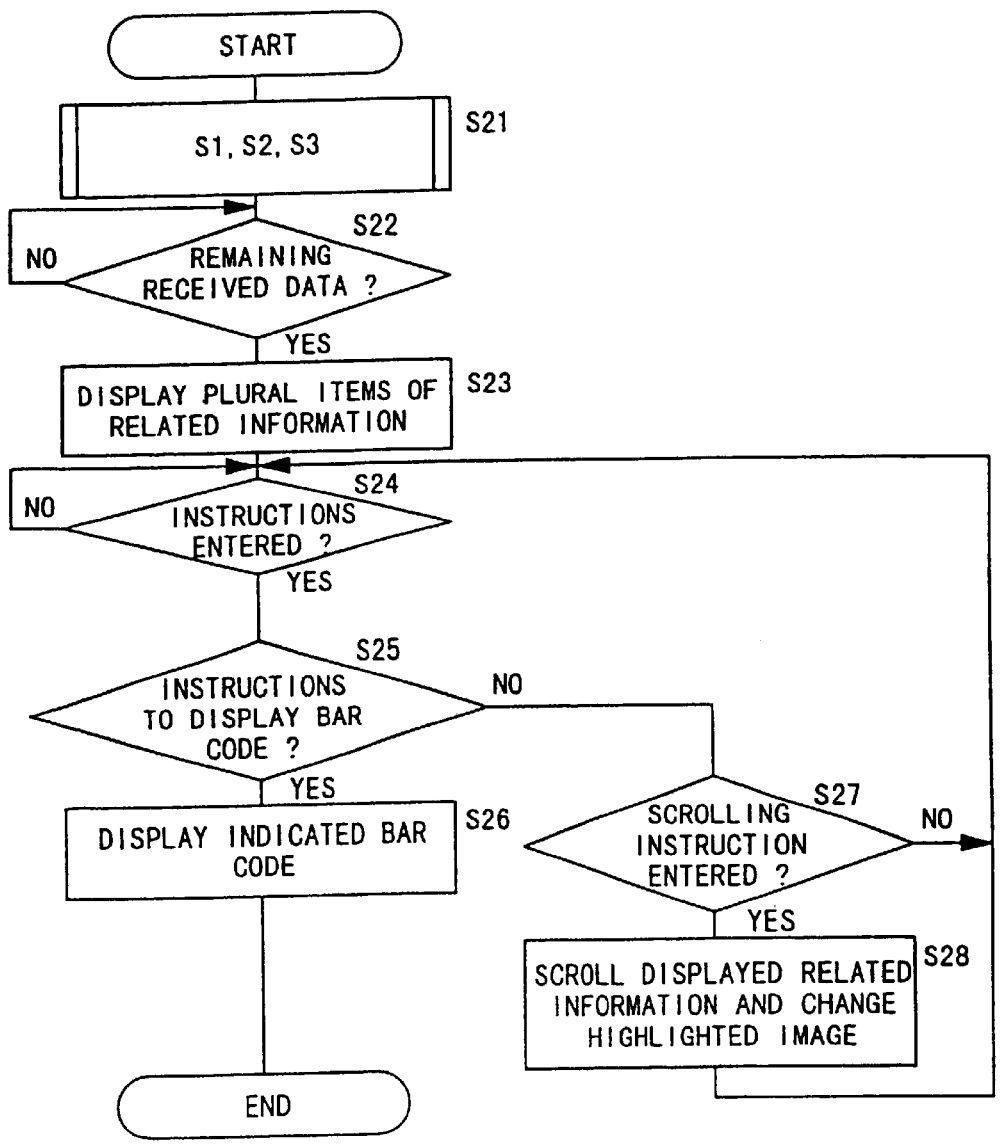
FIG. 17 is a flowchart of an operation sequence for displaying a bar code of a desired one of a plurality of articles on the portable information communication terminal.

FIG. 17 is a flowchart of an operation sequence for selecting a desired one of additional information codes (related-information data) 306 displayed in FIG. 15 as the four article images 306ba, 306bb, 306bc, 306bd with a selecting instruction entered by the user via the manual control pad 56, and displaying the article discount code 304ai corresponding to the selected additional information code 306 in the displayed image 57a on the display unit 58 as shown in FIG. 11.

In step S21 shown in FIG. 17, the processing in steps S1–S3 shown in FIG. FIG. 12 is carried out. Specifically, in step S1 shown in FIG. 12, the CPU 224 intermittently or continuously confirms whether there is received data 301 in the wireless communication block 220 as a wireless signal receiver or not. If there is received data 301 in the wireless communication block 220, then the CPU 224 transfers the received data 301 to the working memory 226 in step S2. In step S3, the CPU 224 reads the article discount code 304a from the received data 301, and converts the article discount code 304a into bar code data as optically readable code-related data.

In step S22, the CPU 224 determines whether there is any remaining received data 301 or not. In the example shown in FIG. 15, the processing in step S21 is further repeated three times. Stated otherwise, when the reception of four received data 301 relative to the four article images 306ba, 306bb, 306bc, 306bd is completed, control goes from step S22 to step S23.

In step S23, the CPU 224 reads the additional information codes (related-information data) from the working memory 226, expands the additional information codes, and displays the image 57c shown in FIG. 15 on the display unit 58 via the LCDC 228.

The displayed image 57c is comprised of the four split images 57ca, 57cb, 57cc, 57cd which display the article image 306ba of sandwich, the article image 306bb of wine, the article image 306bc of meat, and the article image 306bd of ice cream, respectively, based on the four received data 301.

In step S24, the CPU 224 monitors the manual control pad 56 in the input block 234 for an instruction entered by the user. When an instruction is entered by the user, the CPU 224 confirms in step S25 whether the entered instruction represents a request for displaying a bar code in a selected image or not. If the entered instruction does not represent a request for displaying a bar code, then the CPU 224 confirms in step S27 whether the entered instruction is an instruction for scrolling the split images 57ca, 57cb, 57cc, 57cd in the displayed image 57c shown in FIG. 15 or not. If the entered instruction is a scrolling instruction, then the CPU 224 scrolls split images 57ca, 57cb, 57cc, 57cd, successively changing highlighted images in step S28.

If the entered instruction is not a scrolling instruction in step S27, or if the scrolling process in step S28 is finished, then control goes back to step S24 to confirm whether there is an instruction entered by the user or not.

If the entered instruction represents a request for displaying a bar code in step S25, then the CPU 224 displays the image 57a (see FIG. 11) including the article discount code 304ai expressed as a bar code which corresponds to the highlighted one of the split images 57ca, 57cb, 57cc, 57cd on the display unit 58.

In this manner, the user can display the desired article discount code 304ai corresponding to a desired additional information code (related-information data) 306 selected from the additional information codes (related-information data) 306 (the four article images 306ba, 306bb, 306bc, 306bd in the example shown in FIG. 15) in the displayed image 57a on the display unit 58.

According to another embodiment of the present invention, if the portable information communication terminal 28 has a uniquely identifiable individual identification code (so-called individual ID such as a hardware serial number or a production serial number) such as an identification code used by a portable telephone set, the individual identification code may be stored in the nonvolatile memory 222. If the individual identification code stored in the nonvolatile memory 222 can be read by the CPU 224, then the individual identification code may be displayed on the display screen 57 of the display unit 58 in the same representation as shown in FIG. 11, i.e., an optically readable graphic representation.

According to still another embodiment of the present invention, it is assumed that the portable information communication terminal 28 stores a user identification code (user ID) in the nonvolatile memory 222. The user identification code may be manually entered and stored in the nonvolatile memory 222 by the user when the user obtains, e.g., purchases, the portable information communication terminal 28. If the user identification code stored in the nonvolatile memory 222 can be read by the CPU 224, then the user identification code may be displayed on the display screen 57 of the display unit 58 in the same representation as shown in FIG. 11, i.e., an optically readable graphic representation.

Figure 18:
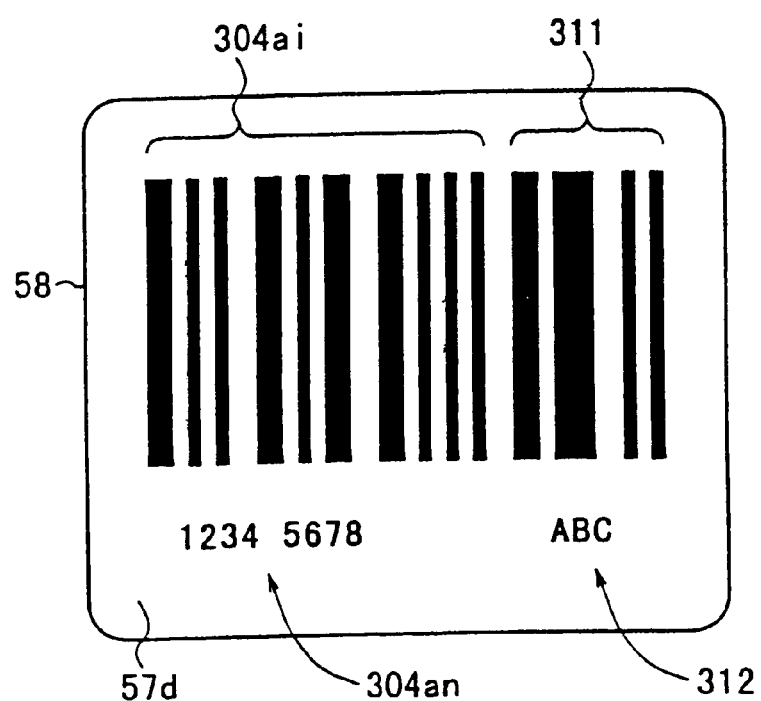
FIG. 18 is a view showing a displayed image of a bar code, which represents an article discount code and an individual ID, on the portable information communication terminal.

FIG. 18 shows an example of the displayed image 57d which includes the article discount code 304ai expressed as a bar code relative to a particular code as a basic code and the article discount code 304an which expresses the article discount code as a number, and also includes an individual identification code 311 expressed as a bar code and an individual identification code 312 which is an alphabetic representation of the individual identification code 311.

In the example shown in FIG. 18, the individual identification code 311 and the individual identification code 312 may be replaced respectively with a user identification 109 code expressed as a bar code and a user identification code which is representative of the name of the user. These user identification codes may be displayed together with the article discount code 304ai expressed as a bar code and the article discount code 304an expressed as a numerical representation.

Figure 19:
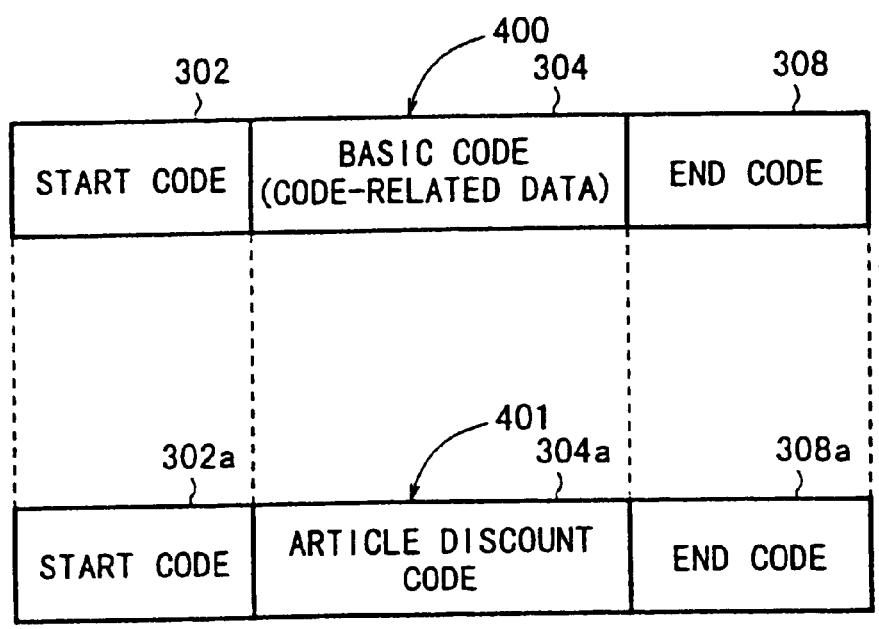
FIG. 19 is a diagram showing the contents of received data including only basic data basically.

According to yet another embodiment of the present invention, in the example shown in FIG. 1 and the example shown in FIG. 6, when the portable information communication terminal 28 is connected to the entertainment apparatus 102 or when the portable information communication terminal 28 and the entertainment apparatus 102 are spaced from each other within a distance capable of infrared communications, the transmitting station 20 can transmit, to the portable information communication terminal 28, data 400 (401) which comprises, as shown in FIG. 19, a start code 302 (302a), a basic code (code-related data) 304 (304a) as basic data following the start code 302 (302a), and an end code 308 (308a) following the basic code 304 (304a), but not an additional information code (related-information data) 306, instead of the received data 300 (301) shown in FIG. 10. The data 400 (401) is received as received data 400 (401) by the portable information communication terminal 28.

FIG. 19 is a flowchart of an operation sequence of the above embodiment in which the data 400 (401) is received as received data 400 (401) by the portable information communication terminal 28.

In step S31 shown in FIG. 31, the CPU 224 of the portable information communication terminal 28 confirms whether there is received data 401 in the wireless communication block 220. If there is received data 401 in the wireless communication block 220, then the CPU 224 transfers the received data 401 to the working memory 226 in step S32. In step S33, the CPU 224 transfers the received data 401 to the entertainment apparatus 102 via the serial communication block 236 or the infrared communication block 238.

In the entertainment apparatus 102, the CPU 252 confirms the transfer of the received data 401 in step S41, and then transfer the received data 401 to the main memory 258 in step S42.

In step S43, the CPU 252 searches the optical disk 156 as a mass-storage medium and/or the main memory 258 for data using a key represented by the article discount code 304a as a basic code (code-related data) in the received data 401, reads related-information data as an additional information code corresponding to the article discount code 304a, and sends the related-information data from the main memory 258 via the graphic processor 260 to the display monitor 164.

In step S44, the CPU 252 displays the same image as the image 57b shown in FIG. 13 at an enlarged scale on the display screen 201 of the display monitor 164. Specifically, the display screen 201 of the display monitor 164 displays "sandwich" as the article name 306aa based on the article name data 306a, a color image in perspective of a sandwich as the article image 306ba based on the article image data 306b, "30% OFF!" as the article message 306da based on the article message data 306d, and "¥280" as the discount price 306ca based on the article price data 306c.

In the portable information communication terminal 28, the CPU 224 executes step S34 after it has transmitted the received data 401 to the entertainment apparatus 102 in step S33. Specifically, the CPU 224 executes the processing in steps S3–S5 shown in FIG. 12 in step S34. Specifically, in step S3 shown in FIG. 12, the CPU 224 reads the article discount code 304a from the received data 301, and converts the article discount code 304a into bar code data as optically readable code-related data. In step S4, the CPU 224 transfers the optically readable code-related data, i.e., bar code data, to the LCDC 228, which displays the article discount code 304ai as a bar code in the upper area of the displayed image 57a on the display unit 58 shown in FIG. 11. In step S5, the CPU 224 and the LCDC 228 also display the article discount code 304an expressed as a number in the lower area of the displayed image 57a on the display unit 58 shown in FIG. 11.

Figure 20:
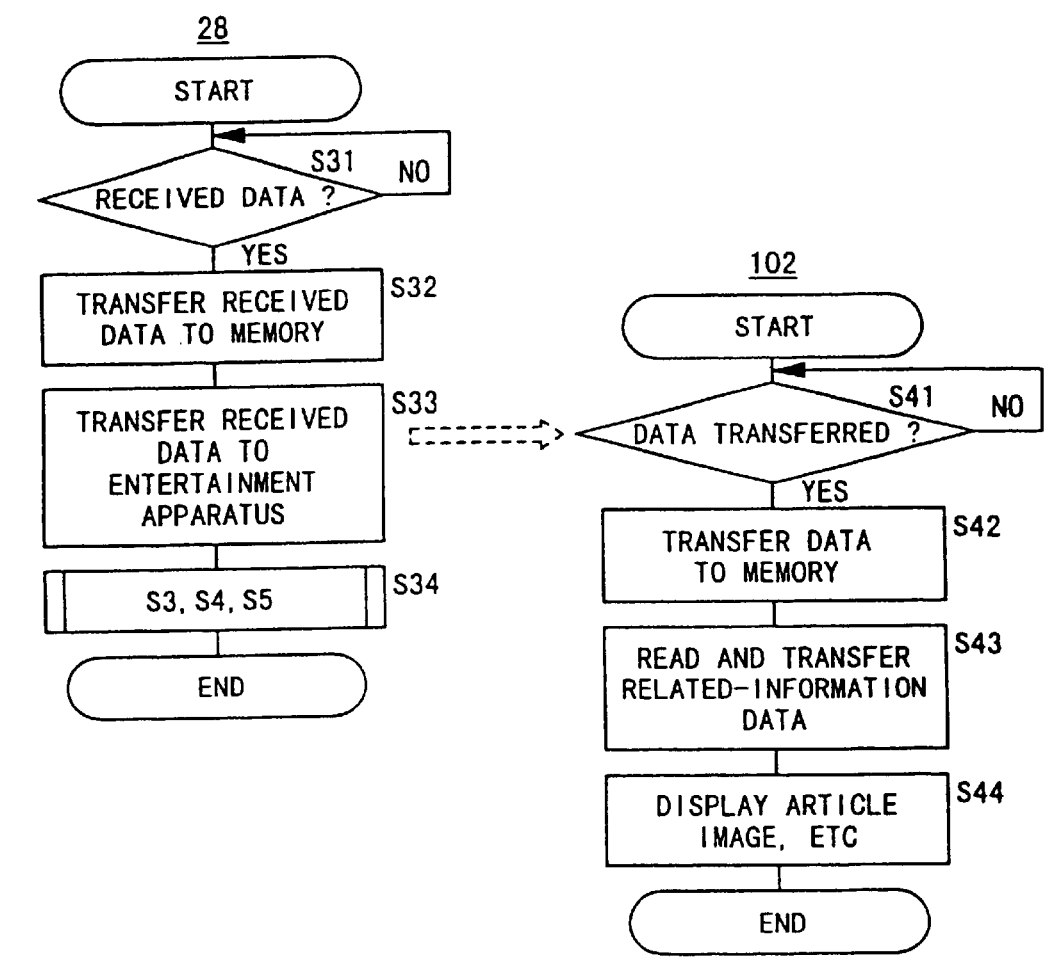
FIG. 20 is a flowchart of an operation sequence for reading an article image corresponding to received data including only basic data from a mass-storage storage medium and displaying the image on a display monitor.

In the embodiment described above with reference to the flowchart of FIG. 20, since no image data is contained in the data transmitted from the transmitting station 20, the transmitted data has a reduced amount of data. Since the related-information data employs data stored in the optical disk 156, a very fine, high-quality image can be displayed at an enlarge scale on the display screen 201 of the display monitor 164.

Figure 21:
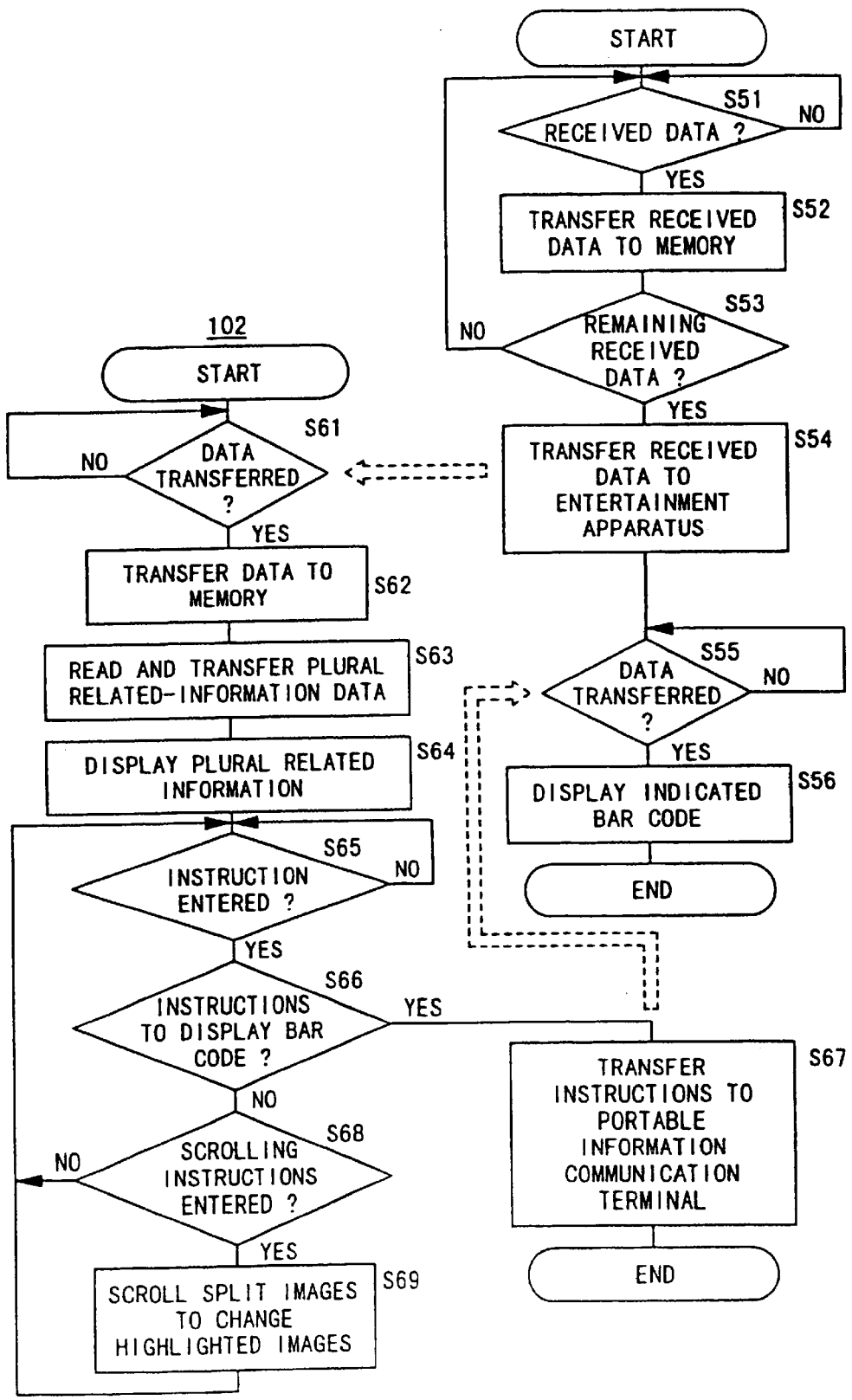
FIG. 21 is a flowchart of an operation sequence for reading a plurality of article images corresponding to received data including a plurality of basic data and displaying the image on the display monitor, selecting a desired one of the article images on the display monitor, and displaying a bar code corresponding to the selected article image on the portable information communication terminal.

FIG. 21 is a flowchart of an operation sequence of yet still another embodiment of the present invention. In this embodiment, in the example shown in FIG. 1 and the example shown in FIG. 6, when the portable information communication terminal 28 is connected to the entertainment apparatus 102 or when the portable information communication terminal 28 and the entertainment apparatus 102 are spaced from each other within a distance capable of infrared communications, the transmitting station 20 can transmit, to the portable information communication terminal 28, a plurality of data 401 each comprising, as shown in FIG. 19, a start code 302 (302a), a basic code (code-related data) 304 (304a), and an end code 308 (308a). The data 401 is received as a plurality received data 401 by the portable information communication terminal 28.

The entertainment apparatus 102 reads a plurality of items of related information corresponding to a plurality of received basic codes (code-related data) 304 (304a) from the optical disk 156 or the like, and displays the read items of related information on the display screen 201 of the display monitor 164. Based on an instruction entered from the manual controller 108, the entertainment apparatus 102 selects desired related information from the items of related information (see FIG. 6) displayed on the display screen 201 of the display monitor 164. Thereafter, the user enters, via the manual controller 108, an instruction to display a bar code relative to the basic code (particular code) corresponding to the selected related information. The corresponding code is now displayed on the display screen 57 of the display unit 58 of the portable information communication terminal 28.

In steps S51 through S53 shown in FIG. 21, a plurality of received data 401 having different article discount codes 304a, as shown in FIG. 19, are received by the portable information communication terminal 28, and stored in the working memory 226.

In step S54, the plural received data 401 are transferred to the entertainment apparatus 102 via the serial communication block 236 or the infrared communication block 238.

If the CPU 252 of the entertainment apparatus 102 receives the plural received data 401 in step S61, then the CPU 252 transfers the received data 401 to the main memory 258 in step S62.

In step S63, the CPU 252 reads a plurality of related-information data corresponding to the different article discount codes 304a from the optical disk 156. Then, in step S64, the CPU 252 displays the same image as the image shown in FIG. 15 at an enlarged scale on the display screen 201 of the display monitor 164.

In steps S65 through S69, the CPU 252 executes the same processing as the processing in steps S24 through S28 shown in FIG. 17 which has been described above with respect to the portable information communication terminal 28.

Specifically, in step S65, the CPU 252 monitors the manual controller 108 in the input block 254 for an instruction entered by the user. When an instruction is entered by the user, the CPU 252 confirms in step S66 whether the entered instruction represents a request for displaying a bar code in a selected image or not. If the entered instruction does not represent a request for displaying a bar code, then the CPU 252 confirms in step S68 whether the entered instruction is an instruction for scrolling the split images 57ca, 57cb, 57cc, 57cd on the display screen 201 of the display monitor 164 as shown in FIG. 15 or not (see FIG. 6). If the entered instruction is a scrolling instruction, then the CPU 252 scrolls split images 57ca, 57cb, 57cc, 57cd, successively changes highlighted images in step S69.

If the entered instruction is not a scrolling instruction in step S68, or if the scrolling process in step S69 is finished, then control goes back to step S65 to confirm whether there is an instruction entered by the user or not.

If the entered instruction represents a request for displaying a bar code in step S66, then the CPU 252 transfers the request for displaying a bar code corresponding to the related information selected in step S67 via the serial communication block 250 to the portable information communication terminal 28.

The CPU 224 of the portable information communication terminal 28 which has received the request for displaying a bar code in step S55 displays the image 57a (see FIG. 11) including the article discount code 304ai expressed as a bar code corresponding to the highlighted one of the split images 57ca, 57cb, 57cc, 57cd on the display unit 58 in step S56.

In the embodiment described above with reference to the flowchart of FIG. 21, since no image data is contained in the plural data transmitted from the transmitting station 20, the transmitted data has a highly reduced amount of data. Since the plural related-information data including a large amount of data such as image information employs data stored in the optical disk 156, very fine, high-quality images can be displayed at an enlarge scale on the display screen 201 of the display monitor 164.

Inasmuch as the user enters instructions via the manual controller 108, the user finds it easier and more efficient to enter instructions than via the manual control pad 56 of the portable information communication terminal 28.

Figure 22:
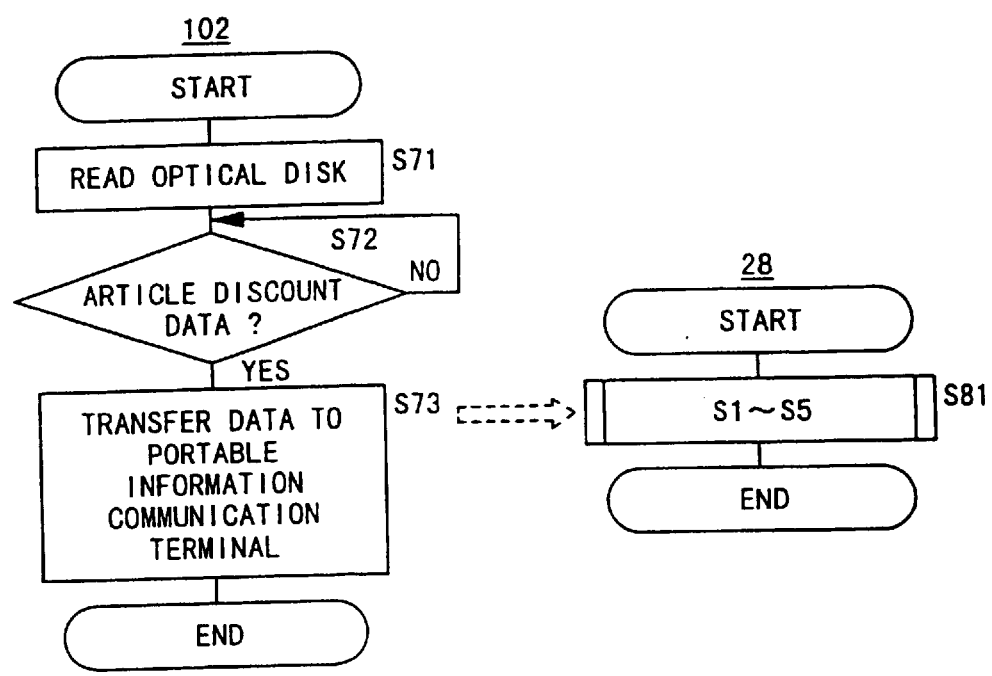
FIG. 22 is a flowchart of an operation sequence for displaying a bar code relative to article discount data on the portable information communication terminal if article discount data is contained in a mass-storage storage medium, without using a broadcasting system.

FIG. 22 is a flowchart of an operation sequence of a further embodiment of the present invention. In this embodiment, instead of receiving data as a wireless signal from the transmitting station 20, the same data is sent from a mass-storage medium such as the optical disk 156, which serves as a software supply means for supplying software to the entertainment apparatus 102, to the portable information communication terminal 28.

In step S71 shown in FIG. 22, the CPU 252 of the entertainment apparatus 102 reads data stored in the optical disk 156. In step S72, the CPU 252 determines whether the read data is data stored in the same pattern as the data 301 shown in FIG. 10 or not, i.e., whether the read data contains the data 301 including the article discount code 304a or not.

If the read data contains the data 301, then the CPU 252 transfers the data via the serial communication block 250 to the portable information communication terminal 28 in step S73.

The portable information communication terminal 28 then processes the data 301 in the same manner as with data received as a wireless signal. Therefore, the CPU 224 of the portable information communication terminal 28 carries out the same process as the process described above with reference to FIG. 12 in step S81.

In step S81, the display screen 57 of the portable information communication terminal 28 displays the article discount code 304ai expressed as a bar code as shown in FIG. 11.

The entertainment system described above with reference to the flowchart of FIG. 22 does not requires the antenna 218 and the wireless communication block 220 of the portable information communication terminal 28 and the infrastructure of the broadcasting system 24. However, the entertainment system described above with reference to the flowchart of FIG. 22 may employ the antenna 218, the wireless communication block 220, and the infrastructure of the broadcasting system 24.

FIG. 23 is a flowchart of an operation sequence of an embodiment for downloading data relative to a plurality of different article discount codes from a mass-storage medium such as the optical disk 156, selecting desired related information with the manual controller 108 and displaying the selected related information on the display screen 201 of the display monitor 164, and displaying an optically readable code such as a bar code corresponding to the selected related information on the display screen 57 of the portable information communication terminal 28.

In step S91 shown in FIG. 23, the CPU 252 of the entertainment apparatus 102 reads data stored in the optical disk 156. In step S92, the CPU 252 determines whether the read data is data stored in the same pattern as the data 301 shown in FIG. 10 or not, i.e., whether the read data contains the data 301 including the article discount code 304a or not. If the read data contains the data 301, then the CPU 252 transfers the data to the main memory 258 in step S93. Similarly, the CPU 252 searches for remaining data 301 in step S94, and then displays related-information data 301 corresponding to the different article discount codes 304a in the same pattern as in FIG. 15 on the display screen 201 of the display monitor 164 in step S95.

Thereafter, the entertainment apparatus 102 carries out steps S96 through S100 which correspond to steps S65 through S69 shown in FIG. 21, and the portable information communication terminal 28 carries out steps S111, S112 which correspond to steps S55, S56 shown in FIG. 21.

After step S112, the display screen 57 of the display unit 58 of the portable information communication terminal 28 displays the article discount code 304ai as an optically readable bar code.

In the examples shown in FIGS. 22 and 23, since the basic data relative to particular codes stored in the optical disk 156 are displayed as the article discount code 304ai on the display screen 57 of the portable information communication terminal 28, the optical disk 156 as a mass-storage medium can indirectly be used as a substitute for the function of an article discount coupon.

The above embodiments of the present invention offer the following various advantages:

First, discount coupons which are usually distributed as printed matter can be distributed as wireless data by way of communications. Specifically, the portable information communication terminal 28 which has a function to receive wireless data transmitted intermittently and periodically converts received compressed data into optically readable data such as bar code data, and displays the converted data on the display screen 57 of the portable information communication terminal 28. Therefore, the user can take the received data with the portable information communication terminal 28 into the CVS 13 as a retail store.

Secondly, since optically readable bar codes including the individual identification code 311 of the portable information communication terminal 28 and the user identification code peculiar to the user can be displayed on the display screen 57 of the portable information communication terminal 28, user information can automatically be entered into the POS system including the POS terminal 14 and the central computer 16, so that the CVS 13 can easily construct a customer database.

Furthermore, a retail store such as the CVS 13 can distribute individual-oriented article information in a wireless manner based on the information including the user identification codes (individual identification codes) collected by the POS terminal 14.

According to the present invention, as described above, a portable information communication terminal and an entertainment system which are easily capable of being combined with industrial systems can be constructed.

Specifically, conventional portable information communication terminals cannot express received data as optically readable data and cannot be used for connection to industrial systems such as store automation systems. However, the portable information communication terminal according to the present invention is capable of expressing received data as optically readable data, and hence can easily be connected to an existing industrial system.

The individual identification code of the portable information communication terminal and the user identification code can also automatically be entered into the existing industrial system.

Conventional non-contact card systems usually output only predetermined codes, but do not offer a function to allow users to select codes such as of additional information. According to the present invention, however, the user can select codes.

Heretofore, there has not been available any process of receiving part of information (basic information) in a wireless manner and receiving other additional information (related information) from a mass-storage package medium of a master unit such as an entertainment apparatus to which a portable information communication terminal is connected. According to the present invention, such additional information can be received from a mass-storage package medium.

According to the present invention, therefore, there can be constructed a portable information communication terminal and an entertainment system which allow a portable information communication terminal capable of receiving wireless signals and an entertainment apparatus to complement each other to create a new function.

According to the present invention, moreover, there can be constructed a portable information communication terminal, an entertainment system, and a storage medium which are capable of increasing the convenience of a portable information communication terminal and an entertainment apparatus.

The present invention can be applied to connection to not only retail stores such as convenience stores, but also industrial systems in networks such as kiosks in theme parks or the like, for an automatic exchange of information between article and service suppliers and customers using existing industrial systems.

The portable information communication terminal is not limited to a portable information communication terminal that can be connected to an entertainment apparatus, but may be applied to personal computers, electronic notebooks, portable telephone sets, PHS terminals, pagers, etc. which have a flat display unite such as a liquid crystal display (LCD) unit.

Although certain preferred embodiments of the present invention have been shown and described in detail, it should be understood that various changes and modifications may be made therein without departing from the scope of the appended claims.

What is claimed is:

1. A portable information communication terminal comprising:
   a wireless signal receiver for receiving basic data relative to a particular code and related-information data including information related to said basic data;
   a code data converter for converting the basic data received by said wireless signal receiver into an optically readable code-related data;
   a display unit having a display screen; and
   a display controller for displaying said related information data on the display screen of said display unit, and in response to a subsequent user command, then displaying the optically readable particular code represented by said code-related data corresponding to said related-information data on the display screen of said display unit;
   wherein said displayed related information data includes pictorial information illustrating an article associated with said particular code, and said displayed related information data comprises photographic article data.

2. A portable information communication terminal according to claim 1, further comprising:
   a memory for storing data relative to an individual identification code indicative of the portable information communication terminal;
   said code converter comprising means for reading the data relative to the individual identification code from said memory and converting the read data into optically readable individual identification code data when converting the basic data into the optically readable code-related data;
   said display controller comprising means for displaying an optically readable individual identification code represented by the individual identification code data when displaying the optically readable particular code represented by the code-related data on the display screen of said display unit.

3. A portable information communication terminal according to claim 1, further comprising:
   a memory for storing data relative to a user identification code indicative of the user of the portable information communication terminal;
   said code data converter comprising means for reading the data relative to the user identification code from said memory and converting the read data into optically readable user identification code data when converting the basic data into the optically readable code-related data;
   said display controller comprising means for displaying an optically readable user identification code represented by the user identification code data when displaying the optically readable particular code represented by the code-related data on the display screen of said display unit.

4. A portable information communication terminal according to claim 1, further comprising:
   a memory for storing at least one of data relative to an individual identification code indicative of the portable information communication terminal and data relative to a user identification code indicative of the user of the portable information communication terminal; said code data converter comprising means for reading at least one of the data relative to the individual identification code and the data relative to the user identification code from said memory and converting at least one of the read data into optically readable individual identification code data and optically readable user identification code data when converting the basic data into the optically readable code-related data;

said display controller comprising means for displaying at least one of an optically readable individual identification code represented by the individual identification code data and an optically readable user identification code represented by the user identification code data when displaying the optically readable particular code represented by the code-related data on the display screen of the display unit.

5. A portable information communication terminal according to claim 1, wherein said optically readable particular code comprises a bar code.

6. A portable information communication terminal according to claim 5, wherein said bar code comprises a bar code for use in discounting an article for sale.

7. A portable information communication terminal according to claim 1, wherein the pictorial information received as displayed related information data comprising photographic article data is received in a compressed format.

8. A portable information communication terminal according to claim 1, wherein the displayed related information further includes as textual information price and discount information.

9. A portable information communication terminal comprising:

a wireless signal receiver for receiving a plurality of basic data relative to a plurality of particular codes and a plurality of related-information data including information related to said plurality of basic data, respectively;

a code data converter for converting the plurality of basic data received by said wireless signal receiver into respective optically readable code-related data;

a display unit for displaying said plurality of related information data on a display screen;

a related-information selector for selecting a desired one of the plurality of related-information data displayed on said display screen; and a display controller for displaying an optically readable particular code represented by said code-related data corresponding to the related-information data selected by said related-information selector, on said display screen of said display unit;

wherein each of said plurality of displayed related information data includes pictorial information illustrating a respective article associated with one of the plurality of particular codes, and each of said displayed related information data comprises photographic article data.

* * * * *